US012657769B2

(12) United States Patent
Joshi et al.

(10) Patent No.: US 12,657,769 B2
(45) Date of Patent: Jun. 16, 2026

(54) AUGMENTING 3D PATIENT SCANS WITH CAD MODEL OF IMPLANTED OBJECT

(71) Applicant: GLOBUS MEDICAL, INC., Audubon, PA (US)

(72) Inventors: Sanjay M. Joshi, Andover, MA (US); Norbert Johnson, North Andover, MA (US); Samuel Paster, Jamaica Plain, MA (US)

(73) Assignee: Globus Medical, Inc., Audubon, PA (US)

( * ) Notice: Subject to any disclaimer, the term of this patent is extended or adjusted under 35 U.S.C. 154(b) by 236 days.

(21) Appl. No.: 18/531,766

(22) Filed: Dec. 7, 2023

(65) Prior Publication Data

US 2025/0191225 A1    Jun. 12, 2025

(51) Int. Cl.
G06T 7/73      (2017.01)
G06T 7/33      (2017.01)
(Continued)

(52) U.S. Cl.
CPC ................ G06T 7/75 (2017.01); G06T 7/344 (2017.01); G06T 7/55 (2017.01); G06T 7/60 (2013.01);
(Continued)

(58) Field of Classification Search
CPC ............ G06T 7/75; G06T 2207/30244; G06T 2207/30004; G06T 7/0012; G06T 7/74; G06T 7/70; G06T 2207/10028; G06T 2207/10116; G06T 7/73; G06T 2210/41; G06T 2200/04; G06T 17/00; G06T 2207/10072; G06T 2207/10081; G06T 7/55; G06T 2207/10121; G06T 2207/10132; G06T 7/344; G06T 11/006; G06T 11/008; G06T 15/20; G06T 19/006; G06T 7/248; G06T 7/33; G06T 19/00; G06T 19/20; G06T 2207/10104; G06T 2207/10136; G06T 2207/20112; G06T 2207/20221; G06T 2219/2004; G06T 7/0004; G06T 7/251; G06T 1/0007; G06T 15/205; G06T 2200/08; G06T 2207/30036; G06T 2207/30068; G06T 7/001; G06T 7/30; G06T 7/50; G06T 2207/30196; G06T 7/00; G06T 7/0014; A61B 2034/2065; A61B 2034/107; A61B 34/35; A61B 2090/365; A61B 34/10; A61B 2034/101;
(Continued)

(56) References Cited

U.S. PATENT DOCUMENTS 4,150,293  A    4/1979   Franke
5,246,010  A    9/1993   Gazzara et al.
(Continued)

OTHER PUBLICATIONS

US 8,231,638 B2, 07/2012, Swarup et al. (withdrawn)

*Primary Examiner* — Xiao M Wu
*Assistant Examiner* — Scott E Sonners

(57)          ABSTRACT

A computer implemented method includes obtaining a plurality of 2D images of an object implanted in a patient and obtaining a computer-aided design (CAD) model corresponding to the object. The method further includes augmenting a 3D scan of the patient to provide a representation of the CAD model with a pose in a reference system of the 3D scan determined based on pose of the object in the 2D images.

18 Claims, 8 Drawing Sheets

(51) Int. Cl.
      *G06T 7/55*          (2017.01)
      *G06T 7/60*          (2017.01)
      *G06T 19/00*         (2011.01)

(52) U.S. Cl.
      CPC .... *G06T 19/00* (2013.01); *G06T 2207/30004*
                (2013.01); *G06T 2210/41* (2013.01)

(58) Field of Classification Search
      CPC ........ A61B 2034/105; A61B 2034/108; A61B
                    2090/367; A61B 34/25; G16H 30/40
      See application file for complete search history.

(56)                    References Cited

U.S. PATENT DOCUMENTS

| | | | |
|---|---|---|---|
| 5,354,314 | A | 10/1994 | Hardy et al. |
| 5,397,323 | A | 3/1995 | Taylor et al. |
| 5,598,453 | A | 1/1997 | Baba et al. |
| 5,772,594 | A | 6/1998 | Barrick |
| 5,791,908 | A | 8/1998 | Gillio |
| 5,820,559 | A | 10/1998 | Ng et al. |
| 5,825,982 | A | 10/1998 | Wright et al. |
| 5,887,121 | A | 3/1999 | Funda et al. |
| 5,911,449 | A | 6/1999 | Daniele et al. |
| 5,951,475 | A | 9/1999 | Gueziec et al. |
| 5,987,960 | A | 11/1999 | Messner et al. |
| 6,012,216 | A | 1/2000 | Esteves et al. |
| 6,031,888 | A | 2/2000 | Ivan et al. |
| 6,033,415 | A | 3/2000 | Mittelstadt et al. |
| 6,080,181 | A | 6/2000 | Jensen et al. |
| 6,106,511 | A | 8/2000 | Jensen |
| 6,122,541 | A | 9/2000 | Cosman et al. |
| 6,144,875 | A | 11/2000 | Schweikard et al. |
| 6,157,853 | A | 12/2000 | Blume et al. |
| 6,167,145 | A | 12/2000 | Foley et al. |
| 6,167,292 | A | 12/2000 | Badano et al. |
| 6,201,984 | B1 | 3/2001 | Funda et al. |
| 6,203,196 | B1 | 3/2001 | Meyer et al. |
| 6,205,411 | B1 | 3/2001 | DiGioia, III et al. |
| 6,212,419 | B1 | 4/2001 | Blume et al. |
| 6,231,565 | B1 | 5/2001 | Tovey et al. |
| 6,236,875 | B1 | 5/2001 | Bucholz et al. |
| 6,246,900 | B1 | 6/2001 | Cosman et al. |
| 6,301,495 | B1 | 10/2001 | Gueziec et al. |
| 6,306,126 | B1 | 10/2001 | Montezuma |
| 6,312,435 | B1 | 11/2001 | Wallace et al. |
| 6,314,311 | B1 | 11/2001 | Williams et al. |
| 6,320,929 | B1 | 11/2001 | Von Der Haar |
| 6,322,567 | B1 | 11/2001 | Mittelstadt et al. |
| 6,325,808 | B1 | 12/2001 | Bernard et al. |
| 6,340,363 | B1 | 1/2002 | Bolger et al. |
| 6,377,011 | B1 | 4/2002 | Ben-Ur |
| 6,379,302 | B1 | 4/2002 | Kessman et al. |
| 6,402,762 | B2 | 6/2002 | Hunter et al. |
| 6,424,885 | B1 | 7/2002 | Niemeyer et al. |
| 6,447,503 | B1 | 9/2002 | Wynne et al. |
| 6,451,027 | B1 | 9/2002 | Cooper et al. |
| 6,477,400 | B1 | 11/2002 | Barrick |
| 6,484,049 | B1 | 11/2002 | Seeley et al. |
| 6,487,267 | B1 | 11/2002 | Wolter |
| 6,490,467 | B1 | 12/2002 | Bucholz et al. |
| 6,490,475 | B1 | 12/2002 | Seeley et al. |
| 6,499,488 | B1 | 12/2002 | Hunter et al. |
| 6,501,981 | B1 | 12/2002 | Schweikard et al. |
| 6,507,751 | B2 | 1/2003 | Blume et al. |
| 6,535,756 | B1 | 3/2003 | Simon et al. |
| 6,560,354 | B1 | 5/2003 | Maurer, Jr. et al. |
| 6,565,554 | B1 | 5/2003 | Niemeyer |
| 6,587,750 | B2 | 7/2003 | Gerbi et al. |
| 6,614,453 | B1 | 9/2003 | Suri et al. |
| 6,614,871 | B1 | 9/2003 | Kobiki et al. |
| 6,619,840 | B2 | 9/2003 | Rasche et al. |
| 6,636,757 | B1 | 10/2003 | Jascob et al. |
| 6,645,196 | B1 | 11/2003 | Nixon et al. |
| 6,666,579 | B2 | 12/2003 | Jensen |
| 6,669,635 | B2 | 12/2003 | Kessman et al. |
| 6,701,173 | B2 | 3/2004 | Nowinski et al. |
| 6,757,068 | B2 | 6/2004 | Foxlin |
| 6,782,287 | B2 | 8/2004 | Grzeszczuk et al. |
| 6,783,524 | B2 | 8/2004 | Anderson et al. |
| 6,786,896 | B1 | 9/2004 | Madhani et al. |
| 6,788,018 | B1 | 9/2004 | Blumenkranz |
| 6,804,581 | B2 | 10/2004 | Wang et al. |
| 6,823,207 | B1 | 11/2004 | Jensen et al. |
| 6,827,351 | B2 | 12/2004 | Graziani et al. |
| 6,837,892 | B2 | 1/2005 | Shoham |
| 6,839,612 | B2 | 1/2005 | Sanchez et al. |
| 6,856,826 | B2 | 2/2005 | Seeley et al. |
| 6,856,827 | B2 | 2/2005 | Seeley et al. |
| 6,879,880 | B2 | 4/2005 | Nowlin et al. |
| 6,892,090 | B2 | 5/2005 | Verard et al. |
| 6,920,347 | B2 | 7/2005 | Simon et al. |
| 6,922,632 | B2 | 7/2005 | Foxlin |
| 6,968,224 | B2 | 11/2005 | Kessman et al. |
| 6,978,166 | B2 | 12/2005 | Foley et al. |
| 6,988,009 | B2 | 1/2006 | Grimm et al. |
| 6,991,627 | B2 | 1/2006 | Madhani et al. |
| 6,996,487 | B2 | 2/2006 | Jutras et al. |
| 6,999,852 | B2 | 2/2006 | Green |
| 7,007,699 | B2 | 3/2006 | Martinelli et al. |
| 7,016,457 | B1 | 3/2006 | Senzig et al. |
| 7,043,961 | B2 | 5/2006 | Pandey et al. |
| 7,062,006 | B1 | 6/2006 | Pelc et al. |
| 7,063,705 | B2 | 6/2006 | Young et al. |
| 7,072,707 | B2 | 7/2006 | Galloway, Jr. et al. |
| 7,083,615 | B2 | 8/2006 | Peterson et al. |
| 7,097,640 | B2 | 8/2006 | Wang et al. |
| 7,099,428 | B2 | 8/2006 | Clinthorne et al. |
| 7,108,421 | B2 | 9/2006 | Gregerson et al. |
| 7,130,676 | B2 | 10/2006 | Barrick |
| 7,139,418 | B2 | 11/2006 | Abovitz et al. |
| 7,139,601 | B2 | 11/2006 | Bucholz et al. |
| 7,155,316 | B2 | 12/2006 | Sutherland et al. |
| 7,164,968 | B2 | 1/2007 | Treat et al. |
| 7,167,738 | B2 | 1/2007 | Schweikard et al. |
| 7,169,141 | B2 | 1/2007 | Brock et al. |
| 7,172,627 | B2 | 2/2007 | Fiere et al. |
| 7,194,120 | B2 | 3/2007 | Wicker et al. |
| 7,197,107 | B2 | 3/2007 | Arai et al. |
| 7,231,014 | B2 | 6/2007 | Levy |
| 7,231,063 | B2 | 6/2007 | Naimark et al. |
| 7,239,940 | B2 | 7/2007 | Wang et al. |
| 7,248,914 | B2 | 7/2007 | Hastings et al. |
| 7,301,648 | B2 | 11/2007 | Foxlin |
| 7,302,288 | B1 | 11/2007 | Schellenberg |
| 7,313,430 | B2 | 12/2007 | Urquhart et al. |
| 7,318,805 | B2 | 1/2008 | Schweikard et al. |
| 7,318,827 | B2 | 1/2008 | Leitner et al. |
| 7,319,897 | B2 | 1/2008 | Leitner et al. |
| 7,324,623 | B2 | 1/2008 | Heuscher et al. |
| 7,327,865 | B2 | 2/2008 | Fu et al. |
| 7,331,967 | B2 | 2/2008 | Lee et al. |
| 7,333,642 | B2 | 2/2008 | Green |
| 7,339,341 | B2 | 3/2008 | Oleynikov et al. |
| 7,366,562 | B2 | 4/2008 | Dukesherer et al. |
| 7,379,790 | B2 | 5/2008 | Toth et al. |
| 7,386,365 | B2 | 6/2008 | Nixon |
| 7,422,592 | B2 | 9/2008 | Morley et al. |
| 7,435,216 | B2 | 10/2008 | Kwon et al. |
| 7,440,793 | B2 | 10/2008 | Chauhan et al. |
| 7,460,637 | B2 | 12/2008 | Clinthorne et al. |
| 7,466,303 | B2 | 12/2008 | Yi et al. |
| 7,493,153 | B2 | 2/2009 | Ahmed et al. |
| 7,505,617 | B2 | 3/2009 | Fu et al. |
| 7,533,892 | B2 | 5/2009 | Schena et al. |
| 7,542,791 | B2 | 6/2009 | Mire et al. |
| 7,555,331 | B2 | 6/2009 | Viswanathan |
| 7,567,834 | B2 | 7/2009 | Clayton et al. |
| 7,594,912 | B2 | 9/2009 | Cooper et al. |
| 7,606,613 | B2 | 10/2009 | Simon et al. |
| 7,607,440 | B2 | 10/2009 | Coste-Maniere et al. |
| 7,623,902 | B2 | 11/2009 | Pacheco |
| 7,630,752 | B2 | 12/2009 | Viswanathan |
| 7,630,753 | B2 | 12/2009 | Simon et al. |

(56) References Cited

U.S. PATENT DOCUMENTS

| | | | |
|---|---|---|---|
| 7,643,862 | B2 | 1/2010 | Schoenefeld |
| 7,660,623 | B2 | 2/2010 | Hunter et al. |
| 7,661,881 | B2 | 2/2010 | Gregerson et al. |
| 7,683,331 | B2 | 3/2010 | Chang |
| 7,683,332 | B2 | 3/2010 | Chang |
| 7,689,320 | B2 | 3/2010 | Prisco et al. |
| 7,691,098 | B2 | 4/2010 | Wallace et al. |
| 7,702,379 | B2 | 4/2010 | Avinash et al. |
| 7,702,477 | B2 | 4/2010 | Tuemmler et al. |
| 7,711,083 | B2 | 5/2010 | Heigl et al. |
| 7,711,406 | B2 | 5/2010 | Kuhn et al. |
| 7,720,523 | B2 | 5/2010 | Omernick et al. |
| 7,725,253 | B2 | 5/2010 | Foxlin |
| 7,726,171 | B2 | 6/2010 | Langlotz et al. |
| 7,742,801 | B2 | 6/2010 | Neubauer et al. |
| 7,751,865 | B2 | 7/2010 | Jascob et al. |
| 7,760,849 | B2 | 7/2010 | Zhang |
| 7,762,825 | B2 | 7/2010 | Burbank et al. |
| 7,763,015 | B2 | 7/2010 | Cooper et al. |
| 7,787,699 | B2 | 8/2010 | Mahesh et al. |
| 7,796,728 | B2 | 9/2010 | Bergfjord |
| 7,813,838 | B2 | 10/2010 | Sommer |
| 7,818,044 | B2 | 10/2010 | Dukesherer et al. |
| 7,819,859 | B2 | 10/2010 | Prisco et al. |
| 7,824,401 | B2 | 11/2010 | Manzo et al. |
| 7,831,294 | B2 | 11/2010 | Viswanathan |
| 7,834,484 | B2 | 11/2010 | Sartor |
| 7,835,557 | B2 | 11/2010 | Kendrick et al. |
| 7,835,778 | B2 | 11/2010 | Foley et al. |
| 7,835,784 | B2 | 11/2010 | Mire et al. |
| 7,840,253 | B2 | 11/2010 | Tremblay et al. |
| 7,840,256 | B2 | 11/2010 | Lakin et al. |
| 7,843,158 | B2 | 11/2010 | Prisco |
| 7,844,320 | B2 | 11/2010 | Shahidi |
| 7,853,305 | B2 | 12/2010 | Simon et al. |
| 7,853,313 | B2 | 12/2010 | Thompson |
| 7,865,269 | B2 | 1/2011 | Prisco et al. |
| D631,966 | S | 2/2011 | Perloff et al. |
| 7,879,045 | B2 | 2/2011 | Gielen et al. |
| 7,881,767 | B2 | 2/2011 | Strommer et al. |
| 7,881,770 | B2 | 2/2011 | Melkent et al. |
| 7,886,743 | B2 | 2/2011 | Cooper et al. |
| RE42,194 | E | 3/2011 | Foley et al. |
| RE42,226 | E | 3/2011 | Foley et al. |
| 7,900,524 | B2 | 3/2011 | Calloway et al. |
| 7,907,166 | B2 | 3/2011 | Lamprecht et al. |
| 7,909,122 | B2 | 3/2011 | Schena et al. |
| 7,925,653 | B2 | 4/2011 | Saptharishi |
| 7,930,065 | B2 | 4/2011 | Larkin et al. |
| 7,935,130 | B2 | 5/2011 | Willliams |
| 7,940,999 | B2 | 5/2011 | Liao et al. |
| 7,945,012 | B2 | 5/2011 | Ye et al. |
| 7,945,021 | B2 | 5/2011 | Shapiro et al. |
| 7,953,470 | B2 | 5/2011 | Vetter et al. |
| 7,954,397 | B2 | 6/2011 | Choi et al. |
| 7,971,341 | B2 | 7/2011 | Dukesherer et al. |
| 7,974,674 | B2 | 7/2011 | Hauck et al. |
| 7,974,677 | B2 | 7/2011 | Mire et al. |
| 7,974,681 | B2 | 7/2011 | Wallace et al. |
| 7,979,157 | B2 | 7/2011 | Anvari |
| 7,983,733 | B2 | 7/2011 | Viswanathan |
| 7,988,215 | B2 | 8/2011 | Seibold |
| 7,996,110 | B2 | 8/2011 | Lipow et al. |
| 8,004,121 | B2 | 8/2011 | Sartor |
| 8,004,229 | B2 | 8/2011 | Nowlin et al. |
| 8,010,177 | B2 | 8/2011 | Csavoy et al. |
| 8,019,045 | B2 | 9/2011 | Kato |
| 8,021,310 | B2 | 9/2011 | Sanborn et al. |
| 8,035,685 | B2 | 10/2011 | Jensen |
| 8,046,054 | B2 | 10/2011 | Kim et al. |
| 8,046,057 | B2 | 10/2011 | Clarke |
| 8,052,688 | B2 | 11/2011 | Wolf, II |
| 8,054,184 | B2 | 11/2011 | Cline et al. |
| 8,054,752 | B2 | 11/2011 | Druke et al. |
| 8,057,397 | B2 | 11/2011 | Li et al. |
| 8,057,407 | B2 | 11/2011 | Martinelli et al. |
| 8,062,288 | B2 | 11/2011 | Cooper et al. |
| 8,062,375 | B2 | 11/2011 | Glerum et al. |
| 8,066,524 | B2 | 11/2011 | Burbank et al. |
| 8,073,335 | B2 | 12/2011 | Labonville et al. |
| 8,079,950 | B2 | 12/2011 | Stern et al. |
| 8,086,299 | B2 | 12/2011 | Adler et al. |
| 8,092,370 | B2 | 1/2012 | Roberts et al. |
| 8,098,914 | B2 | 1/2012 | Liao et al. |
| 8,100,950 | B2 | 1/2012 | St. Clair et al. |
| 8,105,320 | B2 | 1/2012 | Manzo |
| 8,108,025 | B2 | 1/2012 | Csavoy et al. |
| 8,109,877 | B2 | 2/2012 | Moctezuma de la Barrera et al. |
| 8,112,292 | B2 | 2/2012 | Simon |
| 8,116,430 | B1 | 2/2012 | Shapiro et al. |
| 8,120,301 | B2 | 2/2012 | Goldberg et al. |
| 8,121,249 | B2 | 2/2012 | Wang et al. |
| 8,123,675 | B2 | 2/2012 | Funda et al. |
| 8,133,229 | B1 | 3/2012 | Bonutti |
| 8,142,420 | B2 | 3/2012 | Schena |
| 8,147,494 | B2 | 4/2012 | Leitner et al. |
| 8,150,494 | B2 | 4/2012 | Simon et al. |
| 8,150,497 | B2 | 4/2012 | Gielen et al. |
| 8,150,498 | B2 | 4/2012 | Gielen et al. |
| 8,165,658 | B2 | 4/2012 | Waynik et al. |
| 8,170,313 | B2 | 5/2012 | Kendrick et al. |
| 8,179,073 | B2 | 5/2012 | Farritor et al. |
| 8,182,476 | B2 | 5/2012 | Julian et al. |
| 8,184,880 | B2 | 5/2012 | Zhao et al. |
| 8,202,278 | B2 | 6/2012 | Orban, III et al. |
| 8,208,708 | B2 | 6/2012 | Homan et al. |
| 8,208,988 | B2 | 6/2012 | Jensen |
| 8,219,177 | B2 | 7/2012 | Smith et al. |
| 8,219,178 | B2 | 7/2012 | Smith et al. |
| 8,220,468 | B2 | 7/2012 | Cooper et al. |
| 8,224,024 | B2 | 7/2012 | Foxlin et al. |
| 8,224,484 | B2 | 7/2012 | Swarup et al. |
| 8,225,798 | B2 | 7/2012 | Baldwin et al. |
| 8,228,368 | B2 | 7/2012 | Zhao et al. |
| 8,231,610 | B2 | 7/2012 | Jo et al. |
| 8,239,001 | B2 | 8/2012 | Verard et al. |
| 8,241,271 | B2 | 8/2012 | Millman et al. |
| 8,248,413 | B2 | 8/2012 | Gattani et al. |
| 8,256,319 | B2 | 9/2012 | Cooper et al. |
| 8,263,933 | B2 | 9/2012 | Zeile |
| 8,271,069 | B2 | 9/2012 | Jascob et al. |
| 8,271,130 | B2 | 9/2012 | Hourtash |
| 8,281,670 | B2 | 10/2012 | Larkin et al. |
| 8,282,653 | B2 | 10/2012 | Nelson et al. |
| 8,301,226 | B2 | 10/2012 | Csavoy et al. |
| 8,311,611 | B2 | 11/2012 | Csavoy et al. |
| 8,320,991 | B2 | 11/2012 | Jascob et al. |
| 8,332,012 | B2 | 12/2012 | Kienzle, III |
| 8,333,755 | B2 | 12/2012 | Cooper et al. |
| 8,335,552 | B2 | 12/2012 | Stiles |
| 8,335,557 | B2 | 12/2012 | Maschke |
| 8,348,931 | B2 | 1/2013 | Cooper et al. |
| 8,353,963 | B2 | 1/2013 | Glerum |
| 8,358,818 | B2 | 1/2013 | Miga et al. |
| 8,359,730 | B2 | 1/2013 | Burg et al. |
| 8,374,673 | B2 | 2/2013 | Adcox et al. |
| 8,374,723 | B2 | 2/2013 | Zhao et al. |
| 8,379,791 | B2 | 2/2013 | Forthmann et al. |
| 8,386,019 | B2 | 2/2013 | Camus et al. |
| 8,392,022 | B2 | 3/2013 | Ortmaier et al. |
| 8,394,099 | B2 | 3/2013 | Patwardhan |
| 8,395,342 | B2 | 3/2013 | Prisco |
| 8,398,634 | B2 | 3/2013 | Manzo et al. |
| 8,400,094 | B2 | 3/2013 | Schena |
| 8,414,957 | B2 | 4/2013 | Enzerink et al. |
| 8,418,073 | B2 | 4/2013 | Mohr et al. |
| 8,450,694 | B2 | 5/2013 | Baviera et al. |
| 8,452,447 | B2 | 5/2013 | Nixon |
| RE44,305 | E | 6/2013 | Foley et al. |
| 8,462,911 | B2 | 6/2013 | Vesel et al. |
| 8,465,476 | B2 | 6/2013 | Rogers et al. |
| 8,465,771 | B2 | 6/2013 | Wan et al. |
| 8,467,851 | B2 | 6/2013 | Mire et al. |
| 8,467,852 | B2 | 6/2013 | Csavoy et al. |

(56) References Cited

U.S. PATENT DOCUMENTS

| | | |
|---|---|---|
| 8,469,947 B2 | 6/2013 | Devengenzo et al. |
| RE44,392 E | 7/2013 | Hynes |
| 8,483,434 B2 | 7/2013 | Buehner et al. |
| 8,483,800 B2 | 7/2013 | Jensen et al. |
| 8,486,532 B2 | 7/2013 | Enzerink et al. |
| 8,489,235 B2 | 7/2013 | Moll et al. |
| 8,500,722 B2 | 8/2013 | Cooper |
| 8,500,728 B2 | 8/2013 | Newton et al. |
| 8,504,201 B2 | 8/2013 | Moll et al. |
| 8,506,555 B2 | 8/2013 | Ruiz Morales |
| 8,506,556 B2 | 8/2013 | Schena |
| 8,508,173 B2 | 8/2013 | Goldberg et al. |
| 8,512,318 B2 | 8/2013 | Tovey et al. |
| 8,515,576 B2 | 8/2013 | Lipow et al. |
| 8,518,120 B2 | 8/2013 | Glerum et al. |
| 8,521,331 B2 | 8/2013 | Itkowitz |
| 8,526,688 B2 | 9/2013 | Groszmann et al. |
| 8,526,700 B2 | 9/2013 | Issacs |
| 8,527,094 B2 | 9/2013 | Kumar et al. |
| 8,528,440 B2 | 9/2013 | Morley et al. |
| 8,532,741 B2 | 9/2013 | Heruth et al. |
| 8,541,970 B2 | 9/2013 | Nowlin et al. |
| 8,548,563 B2 | 10/2013 | Simon et al. |
| 8,549,732 B2 | 10/2013 | Burg et al. |
| 8,551,114 B2 | 10/2013 | Pena |
| 8,551,116 B2 | 10/2013 | Julian et al. |
| 8,556,807 B2 | 10/2013 | Scott et al. |
| 8,556,979 B2 | 10/2013 | Glerum et al. |
| 8,560,118 B2 | 10/2013 | Green et al. |
| 8,561,473 B2 | 10/2013 | Blumenkranz |
| 8,562,594 B2 | 10/2013 | Cooper et al. |
| 8,571,638 B2 | 10/2013 | Shoham |
| 8,571,710 B2 | 10/2013 | Coste-Maniere et al. |
| 8,573,465 B2 | 11/2013 | Shelton, IV |
| 8,574,303 B2 | 11/2013 | Sharkey et al. |
| 8,585,420 B2 | 11/2013 | Burbank et al. |
| 8,594,841 B2 | 11/2013 | Zhao et al. |
| 8,597,198 B2 | 12/2013 | Sanborn et al. |
| 8,600,478 B2 | 12/2013 | Verard et al. |
| 8,603,077 B2 | 12/2013 | Cooper et al. |
| 8,611,985 B2 | 12/2013 | Lavallee et al. |
| 8,613,230 B2 | 12/2013 | Blumenkranz et al. |
| 8,621,939 B2 | 1/2014 | Blumenkranz et al. |
| 8,624,537 B2 | 1/2014 | Nowlin et al. |
| 8,630,389 B2 | 1/2014 | Kato |
| 8,634,897 B2 | 1/2014 | Simon et al. |
| 8,634,957 B2 | 1/2014 | Toth et al. |
| 8,638,056 B2 | 1/2014 | Goldberg et al. |
| 8,638,057 B2 | 1/2014 | Goldberg et al. |
| 8,639,000 B2 | 1/2014 | Zhao et al. |
| 8,641,726 B2 | 2/2014 | Bonutti |
| 8,644,907 B2 | 2/2014 | Hartmann et al. |
| 8,657,809 B2 | 2/2014 | Schoepp |
| 8,660,635 B2 | 2/2014 | Simon et al. |
| 8,666,544 B2 | 3/2014 | Moll et al. |
| 8,675,939 B2 | 3/2014 | Moctezuma de la Barrera |
| 8,678,647 B2 | 3/2014 | Gregerson et al. |
| 8,679,125 B2 | 3/2014 | Smith et al. |
| 8,679,183 B2 | 3/2014 | Glerum et al. |
| 8,682,413 B2 | 3/2014 | Lloyd |
| 8,684,253 B2 | 4/2014 | Giordano et al. |
| 8,685,098 B2 | 4/2014 | Glerum et al. |
| 8,693,730 B2 | 4/2014 | Umasuthan et al. |
| 8,694,075 B2 | 4/2014 | Groszmann et al. |
| 8,696,458 B2 | 4/2014 | Foxlin et al. |
| 8,700,123 B2 | 4/2014 | Okamura et al. |
| 8,706,086 B2 | 4/2014 | Glerum |
| 8,706,185 B2 | 4/2014 | Foley et al. |
| 8,706,301 B2 | 4/2014 | Zhao et al. |
| 8,717,430 B2 | 5/2014 | Simon et al. |
| 8,727,618 B2 | 5/2014 | Maschke et al. |
| 8,734,432 B2 | 5/2014 | Tuma et al. |
| 8,738,115 B2 | 5/2014 | Amberg et al. |
| 8,738,181 B2 | 5/2014 | Greer et al. |
| 8,740,882 B2 | 6/2014 | Jun et al. |
| 8,746,252 B2 | 6/2014 | McGrogan et al. |
| 8,749,189 B2 | 6/2014 | Nowlin et al. |
| 8,749,190 B2 | 6/2014 | Nowlin et al. |
| 8,761,930 B2 | 6/2014 | Nixon |
| 8,764,448 B2 | 7/2014 | Yang et al. |
| 8,771,170 B2 | 7/2014 | Mesallum et al. |
| 8,781,186 B2 | 7/2014 | Clements et al. |
| 8,781,630 B2 | 7/2014 | Banks et al. |
| 8,784,385 B2 | 7/2014 | Boyden et al. |
| 8,786,241 B2 | 7/2014 | Nowlin et al. |
| 8,787,520 B2 | 7/2014 | Baba |
| 8,792,704 B2 | 7/2014 | Isaacs |
| 8,798,231 B2 | 8/2014 | Notohara et al. |
| 8,800,838 B2 | 8/2014 | Shelton, IV |
| 8,808,164 B2 | 8/2014 | Hoffman et al. |
| 8,812,077 B2 | 8/2014 | Dempsey |
| 8,814,793 B2 | 8/2014 | Brabrand |
| 8,816,628 B2 | 8/2014 | Nowlin et al. |
| 8,818,105 B2 | 8/2014 | Myronenko et al. |
| 8,820,605 B2 | 9/2014 | Shelton, IV |
| 8,821,511 B2 | 9/2014 | von Jako et al. |
| 8,823,308 B2 | 9/2014 | Nowlin et al. |
| 8,827,996 B2 | 9/2014 | Scott et al. |
| 8,828,024 B2 | 9/2014 | Farritor et al. |
| 8,830,224 B2 | 9/2014 | Zhao et al. |
| 8,834,489 B2 | 9/2014 | Cooper et al. |
| 8,834,490 B2 | 9/2014 | Bonutti |
| 8,838,270 B2 | 9/2014 | Druke et al. |
| 8,844,789 B2 | 9/2014 | Shelton, IV et al. |
| 8,855,822 B2 | 10/2014 | Bartol et al. |
| 8,858,598 B2 | 10/2014 | Seifert et al. |
| 8,860,753 B2 | 10/2014 | Bhandarkar et al. |
| 8,864,751 B2 | 10/2014 | Prisco et al. |
| 8,864,798 B2 | 10/2014 | Weiman et al. |
| 8,864,833 B2 | 10/2014 | Glerum et al. |
| 8,867,703 B2 | 10/2014 | Shapiro et al. |
| 8,870,880 B2 | 10/2014 | Himmelberger et al. |
| 8,876,866 B2 | 11/2014 | Zappacosta et al. |
| 8,880,223 B2 | 11/2014 | Raj et al. |
| 8,882,803 B2 | 11/2014 | Iott et al. |
| 8,883,210 B1 | 11/2014 | Truncale et al. |
| 8,888,821 B2 | 11/2014 | Rezach et al. |
| 8,888,853 B2 | 11/2014 | Glerum et al. |
| 8,888,854 B2 | 11/2014 | Glerum et al. |
| 8,894,652 B2 | 11/2014 | Seifert et al. |
| 8,894,688 B2 | 11/2014 | Suh |
| 8,894,691 B2 | 11/2014 | Iott et al. |
| 8,906,069 B2 | 12/2014 | Hansell et al. |
| 8,964,934 B2 | 2/2015 | Ein-Gal |
| 8,992,580 B2 | 3/2015 | Bar et al. |
| 8,996,169 B2 | 3/2015 | Lightcap et al. |
| 9,001,963 B2 | 4/2015 | Sowards-Emmerd et al. |
| 9,002,076 B2 | 4/2015 | Khadem et al. |
| 9,044,190 B2 | 6/2015 | Rubner et al. |
| 9,107,683 B2 | 8/2015 | Hourtash et al. |
| 9,125,556 B2 | 9/2015 | Zehavi et al. |
| 9,131,986 B2 | 9/2015 | Greer et al. |
| 9,215,968 B2 | 12/2015 | Schostek et al. |
| 9,308,050 B2 | 4/2016 | Kostrzewski et al. |
| 9,380,984 B2 | 7/2016 | Li et al. |
| 9,393,039 B2 | 7/2016 | Lechner et al. |
| 9,398,886 B2 | 7/2016 | Gregerson et al. |
| 9,398,890 B2 | 7/2016 | Dong et al. |
| 9,414,859 B2 | 8/2016 | Ballard et al. |
| 9,420,975 B2 | 8/2016 | Gutfleisch et al. |
| 9,492,235 B2 | 11/2016 | Hourtash et al. |
| 9,592,096 B2 | 3/2017 | Maillet et al. |
| 9,750,465 B2 | 9/2017 | Engel et al. |
| 9,757,203 B2 | 9/2017 | Hourtash et al. |
| 9,795,354 B2 | 10/2017 | Menegaz et al. |
| 9,814,535 B2 | 11/2017 | Bar et al. |
| 9,820,783 B2 | 11/2017 | Donner et al. |
| 9,833,265 B2 | 12/2017 | Donner et al. |
| 9,848,922 B2 | 12/2017 | Tohmeh et al. |
| 9,925,011 B2 | 3/2018 | Gombert et al. |
| 9,931,025 B1 | 4/2018 | Graetzel et al. |
| 10,034,717 B2 | 7/2018 | Miller et al. |
| 2001/0036302 A1 | 11/2001 | Miller |
| 2002/0035321 A1 | 3/2002 | Bucholz et al. |

(56)     References Cited

U.S. PATENT DOCUMENTS

| | | |
|---|---|---|
| 2004/0068172 A1 | 4/2004 | Nowinski et al. |
| 2004/0076259 A1 | 4/2004 | Jensen et al. |
| 2005/0096502 A1 | 5/2005 | Khalili |
| 2005/0143651 A1 | 6/2005 | Verard et al. |
| 2005/0171558 A1 | 8/2005 | Abovitz et al. |
| 2006/0100610 A1 | 5/2006 | Wallace et al. |
| 2006/0173329 A1 | 8/2006 | Marquart et al. |
| 2006/0184396 A1 | 8/2006 | Dennis et al. |
| 2006/0241416 A1 | 10/2006 | Marquart et al. |
| 2006/0291612 A1 | 12/2006 | Nishide et al. |
| 2007/0015987 A1 | 1/2007 | Benlloch Baviera et al. |
| 2007/0021738 A1 | 1/2007 | Hasser et al. |
| 2007/0038059 A1 | 2/2007 | Sheffer et al. |
| 2007/0073133 A1 | 3/2007 | Schoenefeld |
| 2007/0156121 A1 | 7/2007 | Millman et al. |
| 2007/0156157 A1 | 7/2007 | Nahum et al. |
| 2007/0167712 A1 | 7/2007 | Keglovich et al. |
| 2007/0233238 A1 | 10/2007 | Huynh et al. |
| 2008/0004523 A1 | 1/2008 | Jensen |
| 2008/0013809 A1 | 1/2008 | Zhu et al. |
| 2008/0033283 A1 | 2/2008 | Dellaca et al. |
| 2008/0046122 A1 | 2/2008 | Manzo et al. |
| 2008/0082109 A1 | 4/2008 | Moll et al. |
| 2008/0089566 A1* | 4/2008 | Node-Langlois ......... G06T 7/30 |
| | | 382/128 |
| 2008/0108912 A1 | 5/2008 | Node-Langlois |
| 2008/0108991 A1 | 5/2008 | von Jako |
| 2008/0109012 A1 | 5/2008 | Falco et al. |
| 2008/0144906 A1 | 6/2008 | Allred et al. |
| 2008/0161680 A1 | 7/2008 | von Jako et al. |
| 2008/0161682 A1 | 7/2008 | Kendrick et al. |
| 2008/0177203 A1 | 7/2008 | von Jako |
| 2008/0214922 A1 | 9/2008 | Hartmann et al. |
| 2008/0228068 A1 | 9/2008 | Viswanathan et al. |
| 2008/0228196 A1 | 9/2008 | Wang et al. |
| 2008/0235052 A1 | 9/2008 | Node-Langlois et al. |
| 2008/0269596 A1 | 10/2008 | Revie et al. |
| 2008/0287771 A1 | 11/2008 | Anderson |
| 2008/0287781 A1 | 11/2008 | Revie et al. |
| 2008/0300477 A1 | 12/2008 | Lloyd et al. |
| 2008/0300478 A1 | 12/2008 | Zuhars et al. |
| 2008/0302950 A1 | 12/2008 | Park et al. |
| 2008/0306490 A1 | 12/2008 | Lakin et al. |
| 2008/0319311 A1 | 12/2008 | Hamadeh |
| 2009/0012509 A1 | 1/2009 | Csavoy et al. |
| 2009/0030428 A1 | 1/2009 | Omori et al. |
| 2009/0080737 A1 | 3/2009 | Battle et al. |
| 2009/0185655 A1 | 7/2009 | Koken et al. |
| 2009/0198121 A1 | 8/2009 | Hoheisel |
| 2009/0216113 A1 | 8/2009 | Meier et al. |
| 2009/0228019 A1 | 9/2009 | Gross et al. |
| 2009/0259123 A1 | 10/2009 | Navab et al. |
| 2009/0259230 A1 | 10/2009 | Khadem et al. |
| 2009/0264899 A1 | 10/2009 | Appenrodt et al. |
| 2009/0281417 A1 | 11/2009 | Hartmann et al. |
| 2010/0022874 A1 | 1/2010 | Wang et al. |
| 2010/0039506 A1 | 2/2010 | Sarvestani et al. |
| 2010/0125286 A1 | 5/2010 | Wang et al. |
| 2010/0130986 A1 | 5/2010 | Mailloux et al. |
| 2010/0228117 A1 | 9/2010 | Hartmann |
| 2010/0228265 A1 | 9/2010 | Prisco |
| 2010/0249571 A1 | 9/2010 | Jensen et al. |
| 2010/0274120 A1 | 10/2010 | Heuscher |
| 2010/0280363 A1 | 11/2010 | Skarda et al. |
| 2010/0331858 A1 | 12/2010 | Simaan et al. |
| 2011/0022229 A1 | 1/2011 | Jang et al. |
| 2011/0077504 A1 | 3/2011 | Fischer et al. |
| 2011/0098553 A1 | 4/2011 | Robbins et al. |
| 2011/0137152 A1 | 6/2011 | Li |
| 2011/0213384 A1 | 9/2011 | Jeong |
| 2011/0224684 A1 | 9/2011 | Larkin et al. |
| 2011/0224685 A1 | 9/2011 | Larkin et al. |
| 2011/0224686 A1 | 9/2011 | Larkin et al. |
| 2011/0224687 A1 | 9/2011 | Larkin et al. |
| 2011/0224688 A1 | 9/2011 | Larkin et al. |
| 2011/0224689 A1 | 9/2011 | Larkin et al. |
| 2011/0224825 A1 | 9/2011 | Larkin et al. |
| 2011/0230967 A1 | 9/2011 | O'Halloran et al. |
| 2011/0238080 A1 | 9/2011 | Ranjit et al. |
| 2011/0276058 A1 | 11/2011 | Choi et al. |
| 2011/0282189 A1* | 11/2011 | Graumann ........... A61B 6/4441 |
| | | 382/132 |
| 2011/0286573 A1 | 11/2011 | Schretter et al. |
| 2011/0295062 A1 | 12/2011 | Gratacos Solsona et al. |
| 2011/0295370 A1 | 12/2011 | Suh et al. |
| 2011/0306986 A1 | 12/2011 | Lee et al. |
| 2012/0035507 A1 | 2/2012 | George et al. |
| 2012/0046668 A1 | 2/2012 | Gantes |
| 2012/0051498 A1 | 3/2012 | Koishi |
| 2012/0053597 A1 | 3/2012 | Anvari et al. |
| 2012/0059248 A1 | 3/2012 | Holsing et al. |
| 2012/0071753 A1 | 3/2012 | Hunter et al. |
| 2012/0108954 A1 | 5/2012 | Schulhauser et al. |
| 2012/0136372 A1 | 5/2012 | Amat Girbau et al. |
| 2012/0143084 A1 | 6/2012 | Shoham |
| 2012/0184839 A1 | 7/2012 | Woerlein |
| 2012/0197182 A1 | 8/2012 | Millman et al. |
| 2012/0226145 A1 | 9/2012 | Chang et al. |
| 2012/0235909 A1 | 9/2012 | Birkenbach et al. |
| 2012/0245596 A1 | 9/2012 | Meenink |
| 2012/0253332 A1 | 10/2012 | Moll |
| 2012/0253360 A1 | 10/2012 | White et al. |
| 2012/0256092 A1 | 10/2012 | Zingerman |
| 2012/0294498 A1 | 11/2012 | Popovic |
| 2012/0296203 A1 | 11/2012 | Hartmann et al. |
| 2013/0006267 A1 | 1/2013 | Odermatt et al. |
| 2013/0016889 A1 | 1/2013 | Myronenko et al. |
| 2013/0030571 A1 | 1/2013 | Ruiz Morales et al. |
| 2013/0035583 A1 | 2/2013 | Park et al. |
| 2013/0060146 A1 | 3/2013 | Yang et al. |
| 2013/0060337 A1 | 3/2013 | Petersheim et al. |
| 2013/0094742 A1 | 4/2013 | Feilkas |
| 2013/0096574 A1 | 4/2013 | Kang et al. |
| 2013/0113791 A1 | 5/2013 | Isaacs et al. |
| 2013/0116706 A1 | 5/2013 | Lee et al. |
| 2013/0131695 A1 | 5/2013 | Scarfogliero et al. |
| 2013/0144307 A1 | 6/2013 | Jeong et al. |
| 2013/0158542 A1 | 6/2013 | Manzo et al. |
| 2013/0165937 A1 | 6/2013 | Patwardhan |
| 2013/0178867 A1 | 7/2013 | Farritor et al. |
| 2013/0178868 A1 | 7/2013 | Roh |
| 2013/0178870 A1 | 7/2013 | Schena |
| 2013/0204271 A1 | 8/2013 | Brisson et al. |
| 2013/0211419 A1 | 8/2013 | Jensen |
| 2013/0211420 A1 | 8/2013 | Jensen |
| 2013/0218142 A1 | 8/2013 | Tuma et al. |
| 2013/0223702 A1 | 8/2013 | Holsing et al. |
| 2013/0225942 A1 | 8/2013 | Holsing et al. |
| 2013/0225943 A1 | 8/2013 | Holsing et al. |
| 2013/0231556 A1 | 9/2013 | Holsing et al. |
| 2013/0237995 A1 | 9/2013 | Lee et al. |
| 2013/0245375 A1 | 9/2013 | DiMaio et al. |
| 2013/0261640 A1 | 10/2013 | Kim et al. |
| 2013/0272488 A1 | 10/2013 | Bailey et al. |
| 2013/0272489 A1 | 10/2013 | Dickman et al. |
| 2013/0274761 A1 | 10/2013 | Devengenzo et al. |
| 2013/0281821 A1 | 10/2013 | Liu et al. |
| 2013/0296884 A1 | 11/2013 | Taylor et al. |
| 2013/0303887 A1 | 11/2013 | Holsing et al. |
| 2013/0307955 A1 | 11/2013 | Deitz et al. |
| 2013/0317521 A1 | 11/2013 | Choi et al. |
| 2013/0325033 A1 | 12/2013 | Schena et al. |
| 2013/0325035 A1 | 12/2013 | Hauck et al. |
| 2013/0331686 A1 | 12/2013 | Freysinger et al. |
| 2013/0331858 A1 | 12/2013 | Devengenzo et al. |
| 2013/0331861 A1 | 12/2013 | Yoon |
| 2013/0342578 A1 | 12/2013 | Isaacs |
| 2013/0345717 A1 | 12/2013 | Markvicka et al. |
| 2013/0345757 A1 | 12/2013 | Stad |
| 2014/0001235 A1 | 1/2014 | Shelton, IV |
| 2014/0012131 A1 | 1/2014 | Heruth et al. |
| 2014/0031664 A1 | 1/2014 | Kang et al. |
| 2014/0046128 A1 | 2/2014 | Lee et al. |
| 2014/0046132 A1 | 2/2014 | Hoeg et al. |

(56) References Cited

U.S. PATENT DOCUMENTS

| | | |
|---|---|---|
| 2014/0046340 A1 | 2/2014 | Wilson et al. |
| 2014/0049629 A1 | 2/2014 | Siewerdsen et al. |
| 2014/0058406 A1 | 2/2014 | Tsekos |
| 2014/0073914 A1 | 3/2014 | Lavallee et al. |
| 2014/0080086 A1 | 3/2014 | Chen |
| 2014/0081128 A1 | 3/2014 | Verard et al. |
| 2014/0088612 A1 | 3/2014 | Bartol et al. |
| 2014/0094694 A1 | 4/2014 | Moctezuma de la Barrera |
| 2014/0094851 A1 | 4/2014 | Gordon |
| 2014/0096369 A1 | 4/2014 | Matsumoto et al. |
| 2014/0100587 A1 | 4/2014 | Farritor et al. |
| 2014/0121676 A1 | 5/2014 | Kostrzewski et al. |
| 2014/0128882 A1 | 5/2014 | Kwak et al. |
| 2014/0130810 A1 | 5/2014 | Azizian et al. |
| 2014/0135796 A1 | 5/2014 | Simon et al. |
| 2014/0142591 A1 | 5/2014 | Alvarez et al. |
| 2014/0142592 A1 | 5/2014 | Moon et al. |
| 2014/0148692 A1 | 5/2014 | Hartmann et al. |
| 2014/0163581 A1 | 6/2014 | Devengenzo et al. |
| 2014/0171781 A1 | 6/2014 | Stiles |
| 2014/0171900 A1 | 6/2014 | Stiles |
| 2014/0171965 A1 | 6/2014 | Loh et al. |
| 2014/0180308 A1 | 6/2014 | von Grunberg |
| 2014/0180309 A1 | 6/2014 | Seeber et al. |
| 2014/0187915 A1 | 7/2014 | Yaroshenko et al. |
| 2014/0188132 A1 | 7/2014 | Kang |
| 2014/0194699 A1 | 7/2014 | Roh et al. |
| 2014/0221819 A1 | 8/2014 | Sarment |
| 2014/0222023 A1 | 8/2014 | Kim et al. |
| 2014/0228631 A1 | 8/2014 | Kwak et al. |
| 2014/0234804 A1 | 8/2014 | Huang et al. |
| 2014/0257328 A1 | 9/2014 | Kim et al. |
| 2014/0257329 A1 | 9/2014 | Jang et al. |
| 2014/0257330 A1 | 9/2014 | Choi et al. |
| 2014/0275760 A1 | 9/2014 | Lee et al. |
| 2014/0275985 A1 | 9/2014 | Walker et al. |
| 2014/0276931 A1 | 9/2014 | Parihar et al. |
| 2014/0276940 A1 | 9/2014 | Seo |
| 2014/0276944 A1 | 9/2014 | Farritor et al. |
| 2014/0288413 A1 | 9/2014 | Hwang et al. |
| 2014/0299648 A1 | 10/2014 | Shelton, IV et al. |
| 2014/0303434 A1 | 10/2014 | Farritor et al. |
| 2014/0303643 A1 | 10/2014 | Ha et al. |
| 2014/0305995 A1 | 10/2014 | Shelton, IV et al. |
| 2014/0309659 A1 | 10/2014 | Roh et al. |
| 2014/0316436 A1 | 10/2014 | Bar et al. |
| 2014/0323803 A1 | 10/2014 | Hoffman et al. |
| 2014/0324070 A1 | 10/2014 | Min et al. |
| 2014/0330288 A1 | 11/2014 | Date et al. |
| 2014/0364720 A1 | 12/2014 | Darrow et al. |
| 2014/0371577 A1 | 12/2014 | Maillet et al. |
| 2015/0039034 A1 | 2/2015 | Frankel et al. |
| 2015/0085970 A1 | 3/2015 | Bouhnik et al. |
| 2015/0146847 A1 | 5/2015 | Liu |
| 2015/0150524 A1 | 6/2015 | Yorkston et al. |
| 2015/0196261 A1 | 7/2015 | Funk |
| 2015/0213633 A1 | 7/2015 | Chang et al. |
| 2015/0335480 A1 | 11/2015 | Alvarez et al. |
| 2015/0342647 A1 | 12/2015 | Frankel et al. |
| 2016/0005194 A1 | 1/2016 | Schretter et al. |
| 2016/0166329 A1 | 6/2016 | Langan et al. |
| 2016/0235480 A1 | 8/2016 | Scholl et al. |
| 2016/0249990 A1 | 9/2016 | Glozman et al. |
| 2016/0302871 A1 | 10/2016 | Gregerson et al. |
| 2016/0320322 A1 | 11/2016 | Suzuki |
| 2016/0331335 A1 | 11/2016 | Gregerson et al. |
| 2017/0135770 A1 | 5/2017 | Scholl et al. |
| 2017/0143284 A1 | 5/2017 | Sehnert et al. |
| 2017/0143426 A1 | 5/2017 | Isaacs et al. |
| 2017/0156816 A1 | 6/2017 | Ibrahim |
| 2017/0202629 A1 | 7/2017 | Maillet et al. |
| 2017/0212723 A1 | 7/2017 | Atarot et al. |
| 2017/0215825 A1 | 8/2017 | Johnson et al. |
| 2017/0215826 A1 | 8/2017 | Johnson et al. |
| 2017/0215827 A1 | 8/2017 | Johnson et al. |
| 2017/0231710 A1 | 8/2017 | Scholl et al. |
| 2017/0258426 A1 | 9/2017 | Risher-Kelly et al. |
| 2017/0273748 A1 | 9/2017 | Hourtash et al. |
| 2017/0296277 A1 | 10/2017 | Hourtash et al. |
| 2017/0360493 A1 | 12/2017 | Zucher et al. |
| 2023/0105822 A1* | 4/2023 | Miles .................... A61B 34/10 623/22.12 |
| 2023/0404671 A1* | 12/2023 | Stambouzou .......... G16H 30/40 |

* cited by examiner

AUGMENTING 3D PATIENT SCANS WITH CAD MODEL OF IMPLANTED OBJECT

FIELD

The present disclosure relates to medical imaging, and in particular, to processing 3D scans of patients, including for computer-aided surgical planning and/or intraoperative navigation using a 3D scan of a patient.

BACKGROUND

Computer-aided surgeries have been using 3D medical imaging scans ("3D scans") of patients for planning and intraoperative navigation. High-quality 3D scans usually require large imaging equipment, such as Computerized Tomography (CT) or Magnetic Resonance Imaging (MRI) equipment, typically situated in a radiology department but not available in operating rooms. The 3D scans can be registered to 2D intraoperative images obtained with readily available x-ray equipment in the operating room, such as by C-Arms. The poses of 2D x-ray images are tracked with a navigation camera, yielding their pose in camera space. Using a 2D-3D registration transform, intraoperative surgical navigation on high-quality 3D images can be provided.

Visualization of navigated instruments and patient anatomy in 3D relies on correct representation of patient anatomy and implants in 3D scans. When an object, such as a metal screw, is implanted in a patient's body after the 3D scan is taken, that object is not visible in the 3D scan. Unfortunately, a surgeon may then plan implantation of another object or trajectory that may come too close or collide with the earlier implanted object.

If an intraoperative 3D imaging system is available, such as Excelsius3D by Globus Medical Inc., it is possible to take a new 3D scan that shows the object. However, the potential benefit of this additional 3D scan may be outweighed by the desire to avoid additional radiation exposure to the patient.

SUMMARY

Some embodiments of the present disclosure are directed to a computer implemented method that includes obtaining a plurality of two-dimensional (2D) images of an object implanted in a patient, and obtaining a computer-aided design (CAD) model corresponding to the object. The method further includes augmenting a three-dimensional (3D) scan of the patient to provide a representation of the CAD model with a pose in a reference system of the 3D scan determined based on pose of the object in the 2D images.

Some other related embodiments are directed to a computer processing platform that includes at least one network interface, at least one processor connected to communicate through the at least one network interface, and at least memory storing instructions executable by the at least one processor to perform operations. The operations include obtaining a plurality of 2D images of an object implanted in a patient, and obtain a computer-aided design (CAD) model corresponding to the object. The operations further include augmenting a 3D scan of the patient to provide a representation of the CAD model with a pose in a reference system of the 3D scan determined based on pose of the object in the 2D images.

These and other methods, computer processing platforms, and computer program products according to embodiments will be or become apparent to one with skill in the art upon review of the following drawings and detailed description. It is intended that all such methods, computer processing platforms, and computer program products be included within this description, be within the scope of the present disclosure, and be protected by the accompanying claims. Moreover, it is intended that all embodiments disclosed herein can be implemented separately or combined in any way and/or combination

BRIEF DESCRIPTION OF THE FIGURES

Aspects of the present disclosure are illustrated by way of example and are not limited by the accompanying drawings. In the drawings.

DETAILED DESCRIPTION

Figure 1:
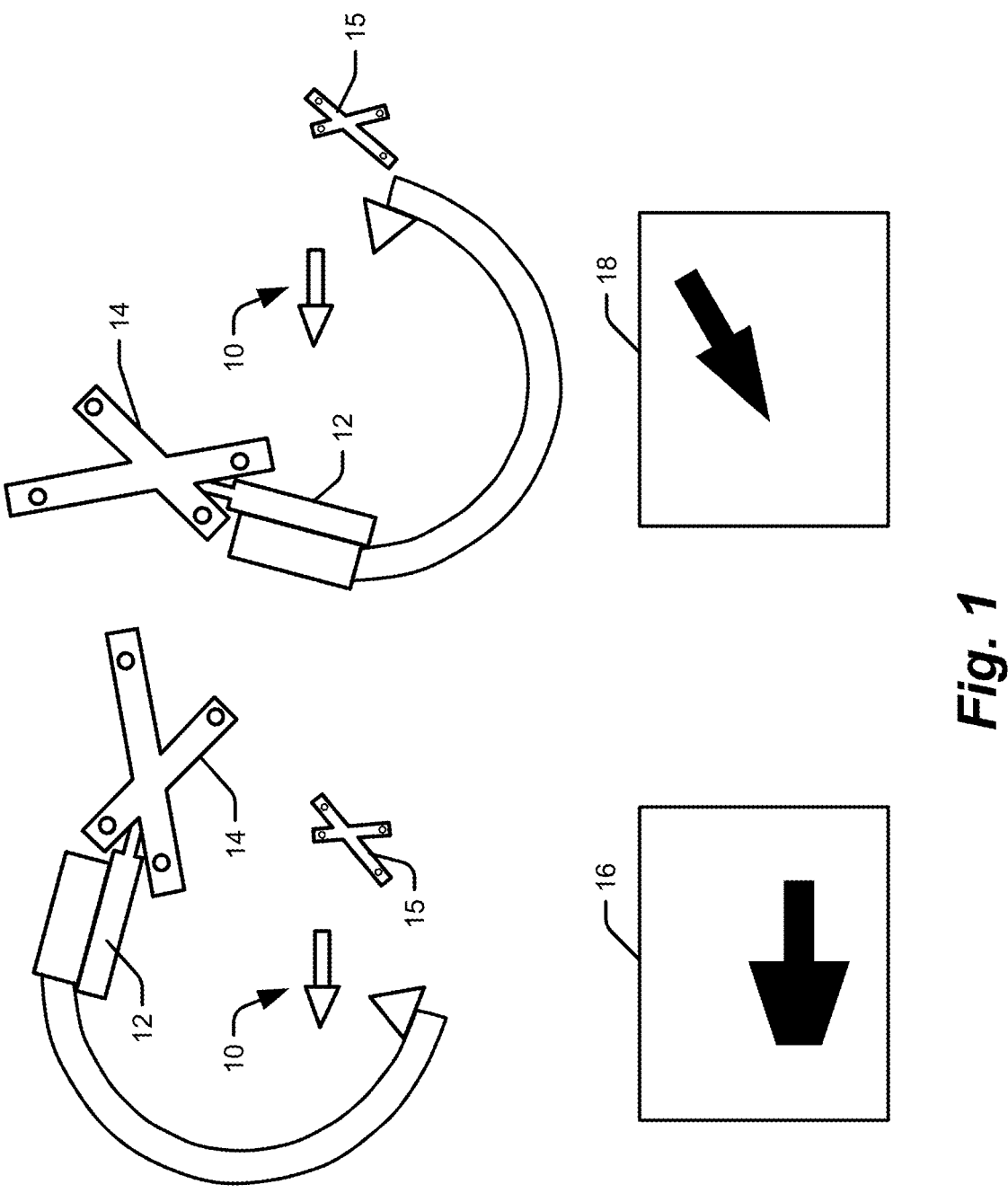
FIG. 1 illustrates two fluoroscopy images rotationally offset by 90 degrees relative to an implanted object which is stationary with respect to a DRB.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present or used in another embodiment.

As explained above, when an object is implanted into a patient's body after the 3D scan is taken, that object is not visible in the 3D scan. A surgeon may therefore unknowingly plan another object or trajectory that may come too close or collide with the earlier implanted object.

Various embodiments of the present disclosure are directed to using a 2D imaging modality to image an implanted object and then register a computer-aided design (CAD) model of the imaged object to a 3D scan of the patient using a 3D imaging modality. The augmented 3D scan may then be used for pre-operative computer-aided planning and intraoperative computer-aided navigation.

The 3D imaging modality may include, but is not limited to, a computerized tomography (CT) scan (e.g., via a C-arm imaging system or O-arm imaging system), a magnetic resonance imaging (MRI) scan (e.g., via a MRI system), Cone Beam Computerized Tomography (CBCT), Micro Computerized Tomography (MCT), 3D ultrasound, etc. The 2D imaging modality may include, but is not limited to, x-ray imaging, fluoroscopy imaging, ultrasound, etc. Although some embodiments are described in the context of fluoroscopy images or other x-ray images, the images processed by these and other embodiments are not limited to any particular imaging modality and images from different imaging modalities may be combined using these embodiments to provide digital reconstruction of the imaged object.

Fluoroscopy imaging systems optimize kV-mA settings to minimize radiation dose while ensuring patient tissue contrast. At these settings, implanted objects such as metal screws and interbodies are radiographically opaque and show up as almost complete black. Some operational embodiments of the present disclosure use this property to treat the fluoroscopy image as a 'binary' image, e.g., black where metal implants are present and white where they are not.

The term "object" can include, but is not limited to, radiographically opaque objects such as screws and interbodies, radiographically 'dark' contrast agents flowing through anatomy of known shape, such as cylindrical blood vessels, etc.

The pose of the object relative to the fluoroscopy images is used as described below. The pose can be estimated in the following two scenarios.

In the first scenario, the operations can assume that the pose of the object does not change with respect to the tracking camera which is tracking pose of the 2D image device. This is possible if the camera is secured in one pose and the patient stays immobilized while the images are acquired with angular offsets relative to the patient. These operations thereby only need to use a few fluoroscopy images, e.g., two or more images.

In the second scenario, the tracking camera needs to be moved between Fluoroscopy images to ensure visibility of the tracking array of the Fluoroscope to the tracking camera. In this scenario, a reference element, such as Dynamic Reference Base (DRB), is securely attached to the patient and tracked by the tracking camera to ensure that the relative pose of the object in patient with respect to the DRB does not change. In this scenario, all the computations can be performed in the DRB reference space because the tracking camera can track the DRB, and the corresponding poses in the camera space can be readily calculated.

FIG. 1 illustrates two fluoroscopy images 16 and 18 that are rotationally offset by 90 degrees relative to an implanted object 10 which is stationary with respect to a DRB 15.

Referring to FIG. 1, an imager 12, e.g., detector, of a fluoroscopy system outputs image 16 of object 10. Imager 12 is rotated about 90 degrees and then outputs image 18 of object 10. Relative pose of the imager 12 to the DRB 15 can be tracked by a tracking camera which tracks pose of a tracking fixture 14 (e.g., reference array) attached to the imager 12 and further tracks pose of the DRB 15. Alternatively or additionally, the imaging device may directly track and record the pose of the imager 12 when capturing images.

Operational approaches are now explained which can be performed to identify and register a CAD model of an imaged object, e.g., object 10, to a 3D scan of the patient, which may be performed alternatively or in full or partial combination.

First Approach—Known Object Geometry

A first operational approach is adapted to be used when the geometry of the object is known to a computer processing platform (also "computer platform"). The computer platform may have access to a database of implantable objects, which defines for each object a CAD model that defines shape and physical dimensions. Alternatively, the computer platform may receive information defining the CAD model from a user or an electronic component of the system. For example, when the computer platform has access to the CAD model and dimensions of the implant (e.g., CREO screw, 40 mm long, 5.5 mm diameter), the problem to be solved reduces to identifying the pose of the CAD model that correspond to the two fluoroscopy images. The pose can be directly estimated by locating the defined features of the CAD model projected into both images.

In accordance with one embodiment, a computer platform includes at least one network interface, at least one processor connected to communicate through the at least one network interface, and at least memory storing instructions executable by the at least one processor to perform operations. The operations obtain a plurality of 2D images of an object implanted in a patient, and obtain a CAD model corresponding to the object. The operations augment a 3D scan of the patient to provide a representation of the CAD model with a pose in a reference system of the 3D scan determined based on pose of the object in the 2D images.

The operation to augment the 3D scan of the patient can include rendering a graphical representation of the object based on the CAD model, and overlay the graphical representation of the object with the pose in the reference system of the 3D scan. The CAD model may be obtained based on selecting the CAD model from a set of CAD models residing in a memory based on information identify the CAD model as corresponding to the object.

The CAD model may define shape and dimensions of the object, and the operation to augment the 3D scan of the patient may provide the representation of the CAD model scaled based on the dimensions of the object defined by the CAD model and posed in the reference system of the 3D scan based on the pose of the object in the 2D images. The operations can further include to project features of the shape defined by the CAD model into the 2D images, and determine the pose of the CAD model in the reference system of the 3D scan based on correlating features of the object in the 2D images to the projected features of the shape defined by the CAD model.

Figure 2:
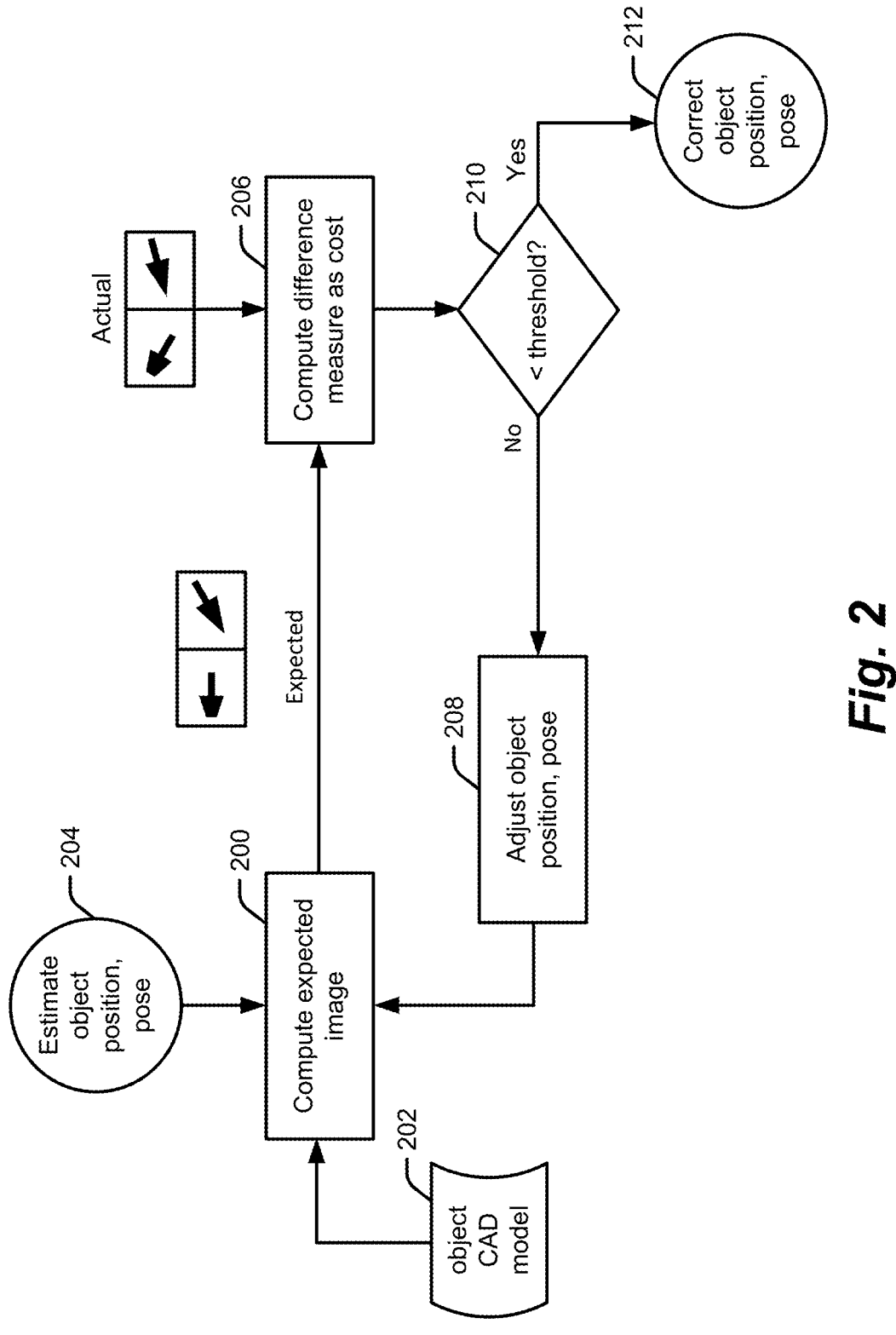
FIG. 2 illustrates an operational flowchart of an algorithm that estimates pose of a computer-aided design (CAD) model relative to an implanted object imagined in two rotationally offset 2D images in accordance with some embodiments.

FIG. 2 illustrates an operational flowchart of an algorithm that estimates the pose of a CAD model relative to an implanted object captured in rotationally offset 2D images in accordance with this first operational embodiment.

Referring to FIG. 2, a computing platform performs operations 200 to compute expected images of an object based on an object CAD model 202, e.g., from a database of implantable objects, and based on estimated 204 object poses (e.g., position and angular orientation) which can be determined based on tracked poses of the imaging device when actual images of the object are acquired. The expected images of the object are compared to actual images of the object output by the imaging device to compute 206 a difference measure as a cost. The comparison of the expected images to the actual images of the object can be more generally perform as a correlation operation that measures similarity between how the CAD model based object is expected to appear in a set of images and how the object actually appears in the actual images.

When the cost is determined 210 to not satisfy a rule (e.g., exceeds a threshold), operations adjust 208 the estimate of the object pose and another cycle of operations are performed to compute 200 another set of expected images of the object and compute 206 the difference between the expected and actual images of the object until the cost is determined 210 to satisfy the threshold.

In contrast, when the cost is determined 210 to satisfy the rule (e.g., is less than the threshold), the object CAD model and pose are output 212. The object CAD model and pose can be used to provide (e.g., overlay or otherwise insert) a CAD model based rendering of the object in one or more 2D images and/or in a 3D scan of the patient. The object CAD model and pose may be used to generate a computer generated representation of the object with a pose that is registered to one or more patient images and/or 3D scans used for pre-operative computer-aided planning and/or intra-operative computer-aided navigation.

In accordance with a further embodiment, corresponding operations to project the features of the shape defined by the CAD model into the 2D images and to determine the pose of the CAD model in the reference system of the 3D scan, can include to estimate pose of the object in the 2D images, compute expected object images based on the features having the shape defined by the CAD model projected into the 2D images using the estimated pose of the object in the 2D images. The operations further include to compare the expected object images to the 2D images of the object to compute a difference measure, and determine whether the difference measure satisfies a rule. When the difference measure satisfy the rule, the operations determine a pose of the CAD model in a 3D space based on the estimating pose of the object in the 2D images, and determine the pose of the CAD model in the reference system of the 3D scan based on the pose of the CAD model in the 3D space.

Second Approach—Known Approximate Object Shape

A second operational approach is adapted to be used when an approximate (partial) shape of the object is known to the computer platform. For example, when the object has a known shape of a cylinder, rectangular block, screw, etc., the measurements of the shape, such as length and diameter of that known shape can be estimated from the actual images (e.g., Fluoro images) using image processing techniques that detect surface lines (e.g., straight lines, etc.). The operations can assume that a point in one of the images corresponds to a line in another one of the images, when the object is imaged from orthogonal directions. In this manner, by identifying one point along this line the operations can determine therefrom the location of the point in a 3D space. The approximate shape and determined location of the object in the 3D space can be used to identify the corresponding CAD model of the object. The pose of the CAD model can then be calculated based on the operations discussed above with regard to FIG. 2 using the now-identified CAD model.

A corresponding operational embodiment when the CAD model defines shape of the object (e.g., but does not define dimensions) can include to correlate features of the shape of the object defined by the CAD model to corresponding features of the object in the 2D images, estimate dimensions of the corresponding features of the object in the 2D images, and estimate dimensions of the shape of the object defined by the CAD model based on the estimated dimensions of the corresponding features of the object in the 2D images.

Third Approach—Unknown Object Shape

A third operational approach is adapted to be used when, for example, insufficient information is known about the object shape to enable use of the first approach or second approach described above, such as when nothing about the object shape is known. The third operational approach enables reconstruction of the object shape in 3D using a plurality of fluoroscopy images. The number of images that are used may be 2, 3, or other relatively small number that is much less than, for example, the 360 images (or more than 180) projection images used in conventional CT scans.

Accurate reconstruction of 3D data for an object is generally not possible using only two x-ray images. The back-propagation algorithm used in CT reconstruction typically uses tens of 2D x-ray images to reconstruct 3D voxel data (e.g., for a typical CT scanner, more than 180 fan beam angle images). The 2D x-ray images represent a "sum" of absorption of x-rays in voxels along their paths, hence this many image samples are needed for a reliable reconstruction. In contrast, binary voxel data enables a different operational approach that enables reconstruction of 3D data for an object with fewer x-ray images as described below.

In binary 2D x-ray images, pixels are bright (Binary 1) where the x-rays ("rays") travelling from an emitter to a detector (imager) go through all voxel containing radio-translucent material. All other dark (Binary 0) pixels are the result of blockage of rays by one or more voxels containing radio-opaque material, i.e., of the object.

Figure 3:
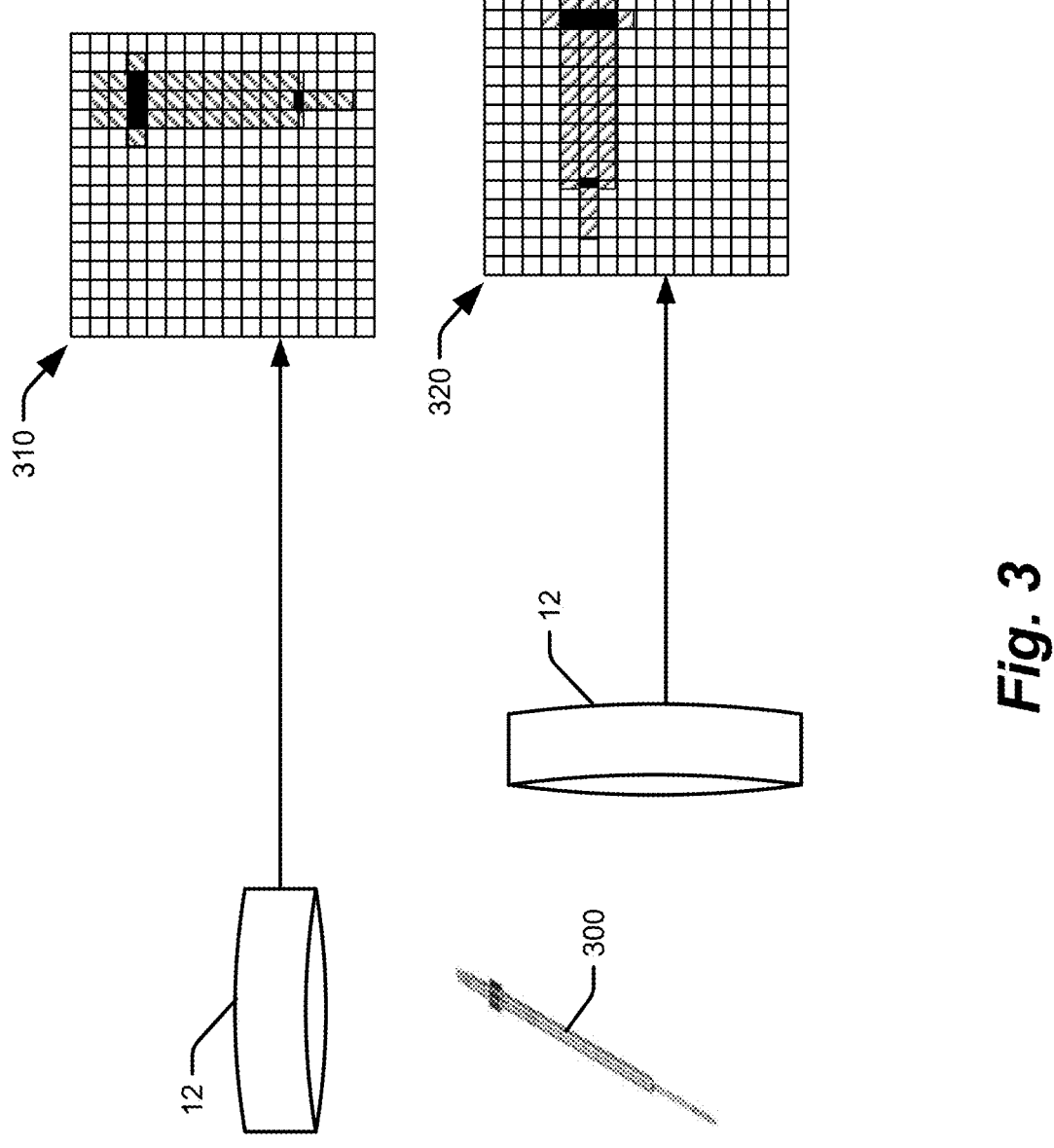
FIG. 3 illustrates two 2D x-ray images of a surgical instrument (object) at rotationally offset poses of an x-ray detector (imager), which can be processed to estimate pose of a CAD model of the imaged surgical instrument in accordance with some embodiments.

FIG. 3 illustrates two 2D x-ray images 310 and 320 of a surgical instrument (object) 300 at rotationally offset poses of an x-ray detector (imager) 12, which can be processed to estimate pose of a CAD model of the imaged surgical instrument in accordance with some embodiments.

Referring to FIG. 3, image 310 shows how the surgical instrument 300 can appear when detector 12 is posed above the surgical instrument to image x-rays from the emitter oppositely posed below the surgical instrument 300. The other image 320 shows how the surgical instrument 300 can appear when detector 12 is posed right of the surgical instrument 300 to image x-rays from the emitter oppositely posed left of the surgical instrument 300.

Another operational embodiment processes two or more x-ray images of binary 3D data which have known poses of the emitter and detector (imager). The poses of the emitter and/or detector can be electronically sensed by the imaging device when the images are acquired and can be indicated with the images, e.g., as metadata provided with the images. Alternatively, when the imaging device itself does not provide the emitter and/or detector poses, a tracking fixture (reference array) can be attached to the detector and tracked in 3D space by a tracking camera, to provide an estimate of detector and emitter poses (e.g., in accordance with an intraoperative Fluoroscopy workflow of ExcelsiusGPS by Globus Medical). For each image (scan), operations create a back-propagation pyramid with the emitter at the apex and the detector at the base, and configured so that the number of rays are equal to the number of pixels in the 2D image. When these pyramids (e.g., two back-propagation pyramids)

are superimposed (e.g., through a binary OR operation), the resulting output can correspond to a 3D frustrum, with voxel values of 1 and 0. The output can be padded with zeros to create a rectangular 3D volume.

Figure 4:
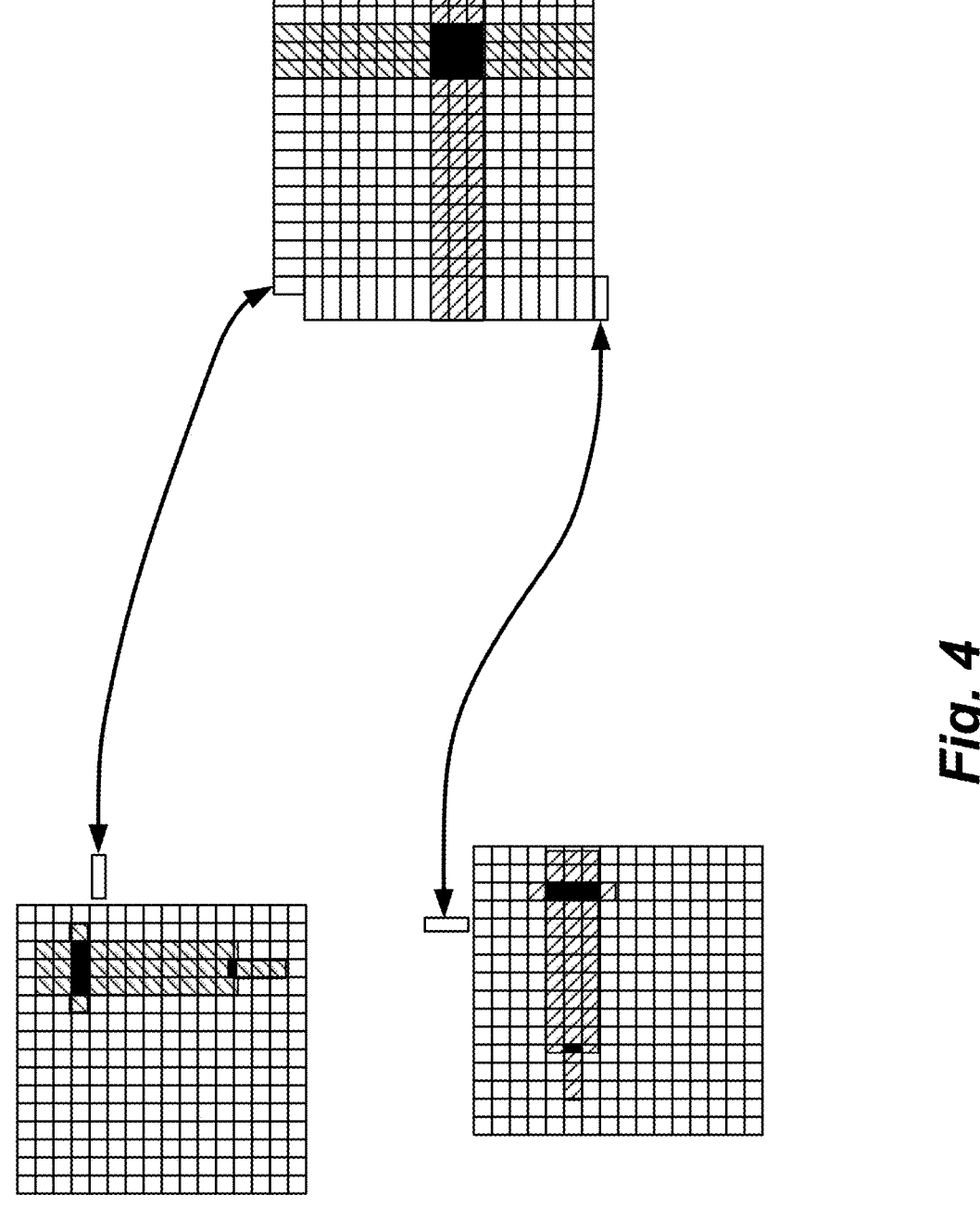
FIG. 4 illustrates operations for reconstruction of one plane of a 3D volume in accordance with some embodiments.

FIG. 4 illustrates corresponding operations for reconstruction of one plane of a 3D volume in accordance with some embodiments. The operations assume two x-ray images with normals orthogonal to each other and approximate each voxel to a cube. One row and one column from each x-ray image is processed with a binary OR operation to create one plane. The lighter gray areas represent the reconstructed path of rays. The black area represents where the cross-hatched paths intersect. Multiple such planes, parallel to each other, create the 3D volume.

The planar reconstruction may be most accurate, or may only be correct, if the actual (physical) object's cross-section in this plane has a substantially rectangular surface that is substantially aligned with the two x-ray images, or if the cross-section substantially fits within one pixel. For an actual (physical) object having a larger cross-section, the approximation into pixels can be provided a result of "boundary digitization." For an actual (physical) object with a relatively small cross-sectional area (e.g., typically corresponding to less than 3 pixels per side), the digitized boundary of the actual surface can be a sufficiently accurate representation. For larger objects, however, the difference could be significant.

Figure 5:
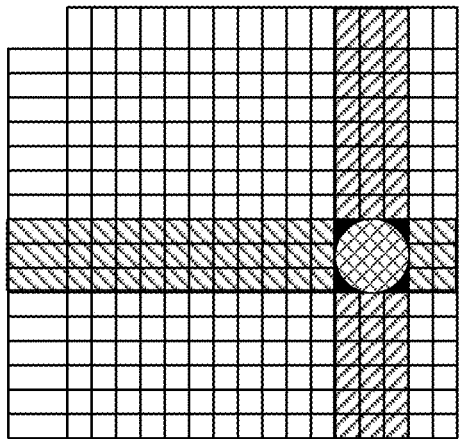
FIG. 5 illustrates impact of image boundary digitization for different cross-sectional areas of an object in accordance with some embodiments.
Figure 5:
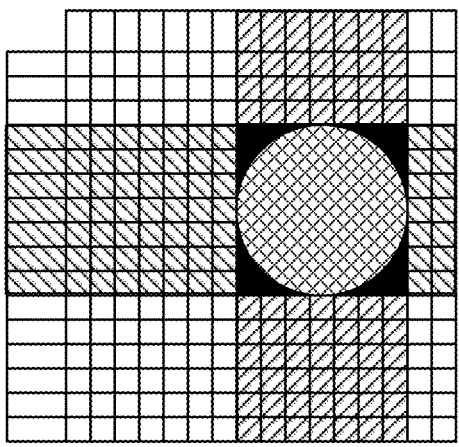

FIG. 5 illustrates the impact of image boundary digitization for different cross-sectional areas of an object in accordance with some embodiments. Referring to FIG. 5, an actual (physical) object has a circular cross-sectional area which is depicted as a circle enclosing cross-hatched lines. The digitized boundary of the object which is generated from the pair of images is depicted as the black square area which encloses the circular cross-sectional area. Accordingly, the curved object surface results in a level of error in the planar reconstruction operations.

Figure 6:
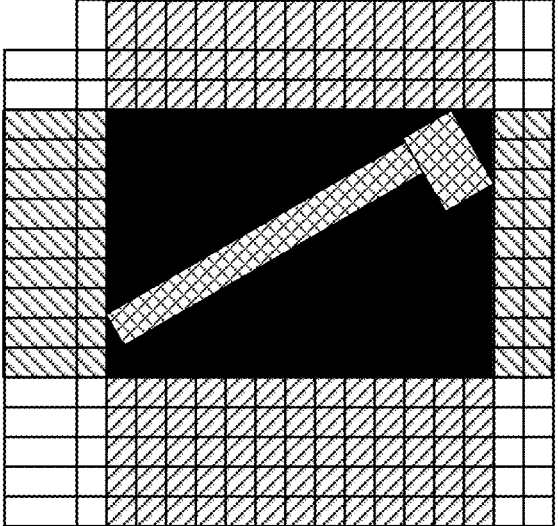
FIG. 6 illustrates the impact of an object not being in an optimal pose for two x-ray images to be processed for planar reconstruction in accordance with some embodiments.

The above scenarios can correspond to the case when the object that is imaged has a relatively small cross-sectional area in the x-ray images. When the object in FIG. 1 is rotated, however, the object's cross-sectional area can grow significantly, which can substantially affect the boundary digitization, such as shown in FIG. 6. FIG. 6 illustrates the impact of an object not being in an optimal pose for two x-ray images to be processed for planar reconstruction in accordance with some embodiments. Referring to FIG. 6, the actual cross-sectional area is illustrated by the hashed area while the digitized boundary of the object generated from the pair of images is depicted as the black rectangular area which encloses the actual cross-sectional area.

Figure 7:
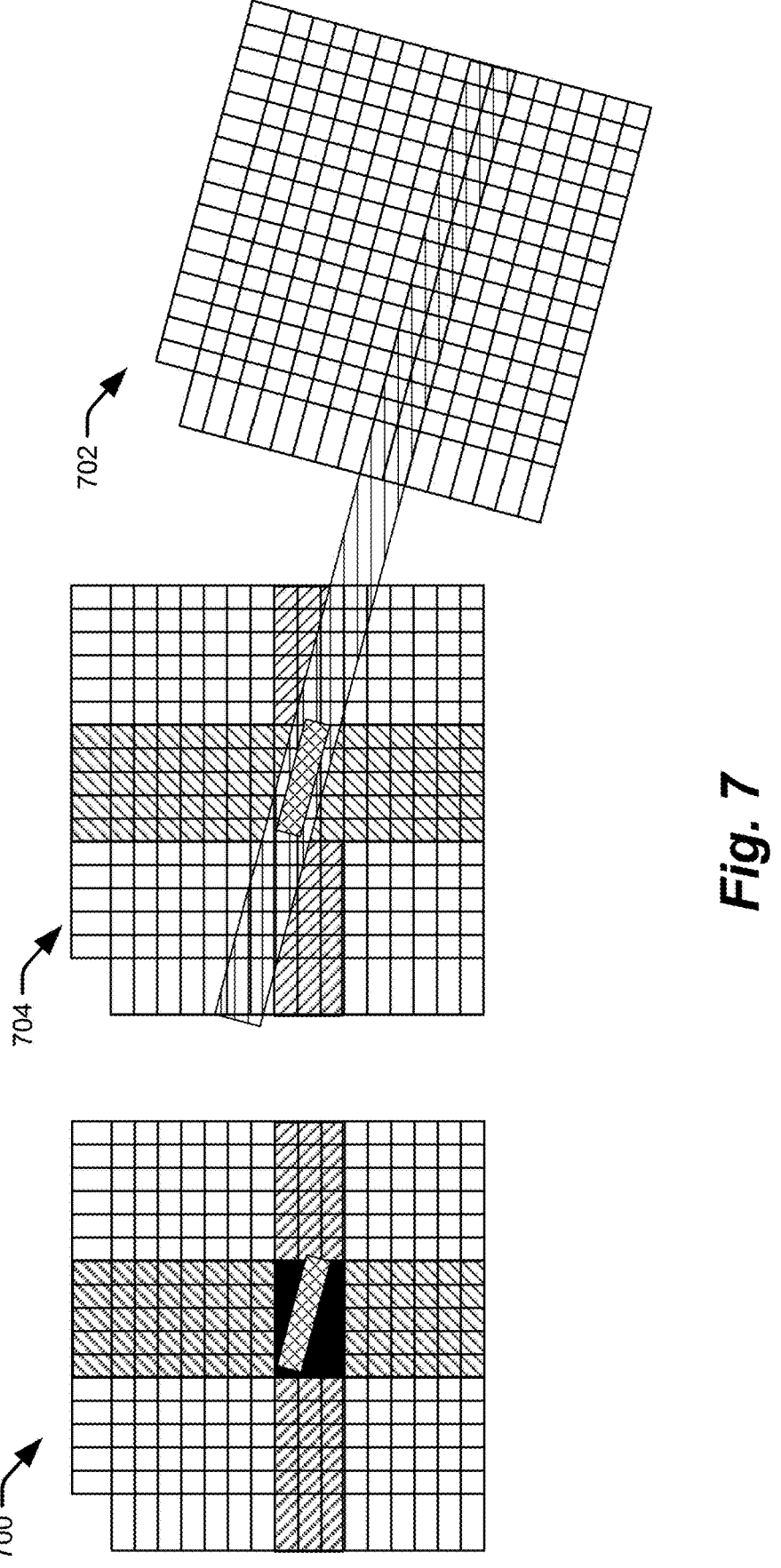
FIG. 7 illustrates operations for iterative refinement of boundary digitization using three images in accordance with some embodiments.

Accuracy of the planar reconstruction operations can be improved by using additional x-ray images of the object from offset poses. Corresponding pixels of the set of x-ray images are processed through the binary OR operation and iteratively refined. FIG. 7 illustrates operations for iterative refinement of boundary digitization using three x-ray images in accordance with some embodiments. Referring to FIG. 7, image 700 depicts the digitized boundary of the object's cross-sectional area initially generated from a pair of images. A subsequent combined image 704 is refined based a third image 702 which results in the more accurate digitized boundary of the object's cross-sectional area shown in the combined image 704.

Figure 8:
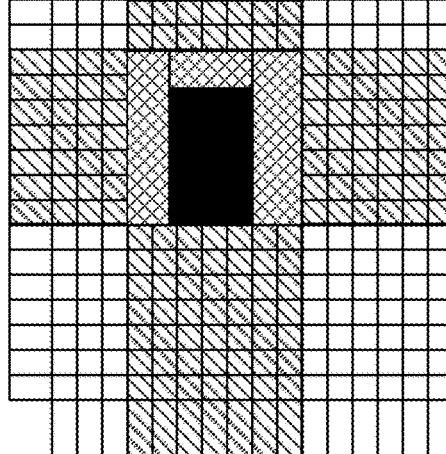
FIG. 8 illustrates operations for boundary digitization of an object having a concave surface, in accordance with some embodiments.

One potential limitation of this approach is that objects with only convex surface boundaries can be reconstructed with substantially improved results. FIG. 8 illustrates operations for boundary digitization of an object having a concave surface, in accordance with some embodiments. Referring to FIG. 8, it is observed that the object has a concave surface boundary, and where digitization of the concave surface boundary may not be able to be refined.

Some further embodiments are directed to operations which are directed to improving accuracy of digitization of objects.

In accordance with some embodiments, a mathematical model can be constructed on the minimum number of images needed to digitally reconstruct a cross-section of a number of pixels. In some example operations, the orientation of an image is defined as the slope of the line from the emitter to the center of the detector. The "horizontal" orientation has slope 0/1=0 and the 'vertical' orientation has slope 1/0=infinity. For a cross-section area of 1×1 pixel, only the 0/1 and 1/0 orientations are sufficient. A cross-section area of 2×2 pixels, however, would need two more orientations, at 1/1 and −1/1 orientation, as shown in FIG. 9.

Figure 9:
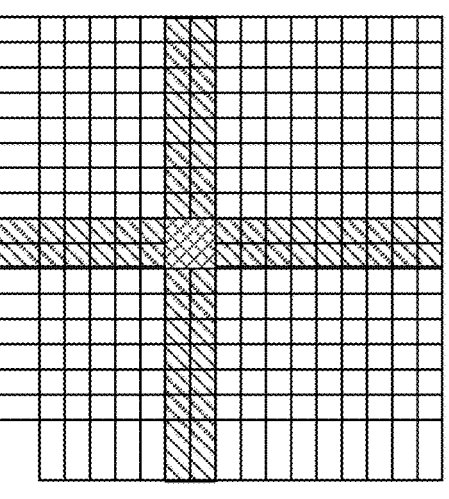
FIG. 9 illustrates operations using four image orientations to reconstruct a 2×2 cross-sectional area of an object in accordance with some embodiments.

FIG. 9 illustrates a scenario where an actual (physical) object should be imaged at four orientations to enable reconstruction of a 2×2 cross-section area with improved accuracy in accordance with one embodiment.

A corresponding operational embodiment can include to for each of the 2D images, to determine poses of an emitter and a detector of an imaging device corresponding to when the 2D image was generated by the imaging device, and to create a back-propagation pyramid estimation of the object in a 3D voxel array based on the object oriented in the 2D image corresponding to the emitter posed at an apex and the detector posed at the base of the back-propagation pyramid, and where the number of voxels in the 3D voxel array is based on a number of pixels in the 2D image. The operations can determine a 3D shape of the object in the 2D images based on superimposing the back-propagation pyramids. The superimposing of the back-propagation pyramids may include performing a binary OR operation on values at corresponding locations in the 3D voxel array of the back-propagation pyramids.

The number of image orientations needed to reliably reconstruct any convex shaped object cross-sectional area is shown in the table below.

| Area (number of pixels) | Number of Orientations | Orientations (Slopes) |
|---|---|---|
| 1 × 1 | 2 | 0/1, 1/0 |
| 2 × 2 | 4 | 0/1, 1/1, −1/1, 1/0 |
| 3 × 3 | 8 | 0/1, 1/2, −1/2, 1/1, −1/1, 2/1, −2/1, 1/0 |
| 4 × 4 | 14 | 0/1, 1/3, 2/3, 1/2, −1/3, −2/3, −1/2, 1/0, 3/1, 3/2, 2/1, −3/1, −3/2, −2/1 |
| 5 × 5 | 22 | 0/1, 1/4, 3/4, 1/3, 2/3, 1/2, −1/4, −3/4, −1/3, −2/3, −1/2, , 1/0, 4/1, 4/3, 3/1, 3/2, 2/1, −4/1, −4/3, −3/1, −3/2, −2/1 |

As the table shows, for an N×N cross-sectional area, the number of orientations necessary to reconstruct the area is less than $N2$ for N>1.

In an illustrative example, assume an x-ray scanner has a 12×12 inch panel, and the object to be imaged is positioned at ⅓rd distance away from detector panel, the imaged size is 9×9 inch, approximately 256 mm×256 mm. For a 512× 512 image resolution, that translates to 0.5 mm/pixel resolution. Thus, objects with small cross-sectional areas, such as a surgical tool with a circular cross-section diameter of 2 mm, can be imaged with less than 16 x-ray images.

For surgical navigation systems with higher accuracy limit (typically 1.5 mm), even fewer images may be sufficient for reconstruction. Further, for surgical navigation, the more important part of navigation is to track the tip of a surgical tool, which often has a relatively simple geometry and a small cross-sectional area, such as a sharp tip or a rectangle. Two images may be sufficient to reconstruct the cross-section of such a tool. Using geometrical information know for the object can reduce the number of images further. The reconstruction process may be performed iteratively using successive images to refine the reconstruction accuracy, e.g., until a threshold level of accuracy is determined. For example, successive images may be acquired and used to iteratively improve the digitized reconstructed shape until the improvement to the difference measurement, e.g., cost, (e.g., operation 206 in FIG. 2) using a last acquired image becomes less an minimum improvement threshold. In contrast, a determination that the last acquired image resulted in an improvement of more than the minimum improvement threshold can trigger another image of the object to be acquired at another pose.

Potential advantages that may be provided by one or more of the embodiments disclosed herein may include to enable overlay of an object CAD model on a 3D scan of a patient by taking fluoroscopy images or other 2D image modality (IES) showing the object implanted in the patient, and registering the images to the 3D scans. This allows the surgeon to avoid unknowingly performing a surgical procedure during computer-aided surgical navigation that results in getting too close or colliding with objects that are not captured in original 3D scans. The objects can include: radiographically opaque objects such as screws and interbodies, radiographically 'dark' contrast agents flowing through anatomy of known shape, such as cylindrical blood vessels, etc. The relative poses of the images may be determined based on information provided by the imaging devices or may be determined using other techniques, such as by camera tracking of tracking figures and possibly also a DRB attached to the patient. Improved accuracy of the object reconstruction can be provided by approximating the object CAD model to a known shape, such as a cylinder, so that a minimum of two fluoroscopy images are sufficient. Further accuracy may be provided when an exact CAD model of the object is identified, such as when the object is known to correspond to a CAD model, so that a minimum of two fluoroscopy images can be sufficient.

Figure 10:
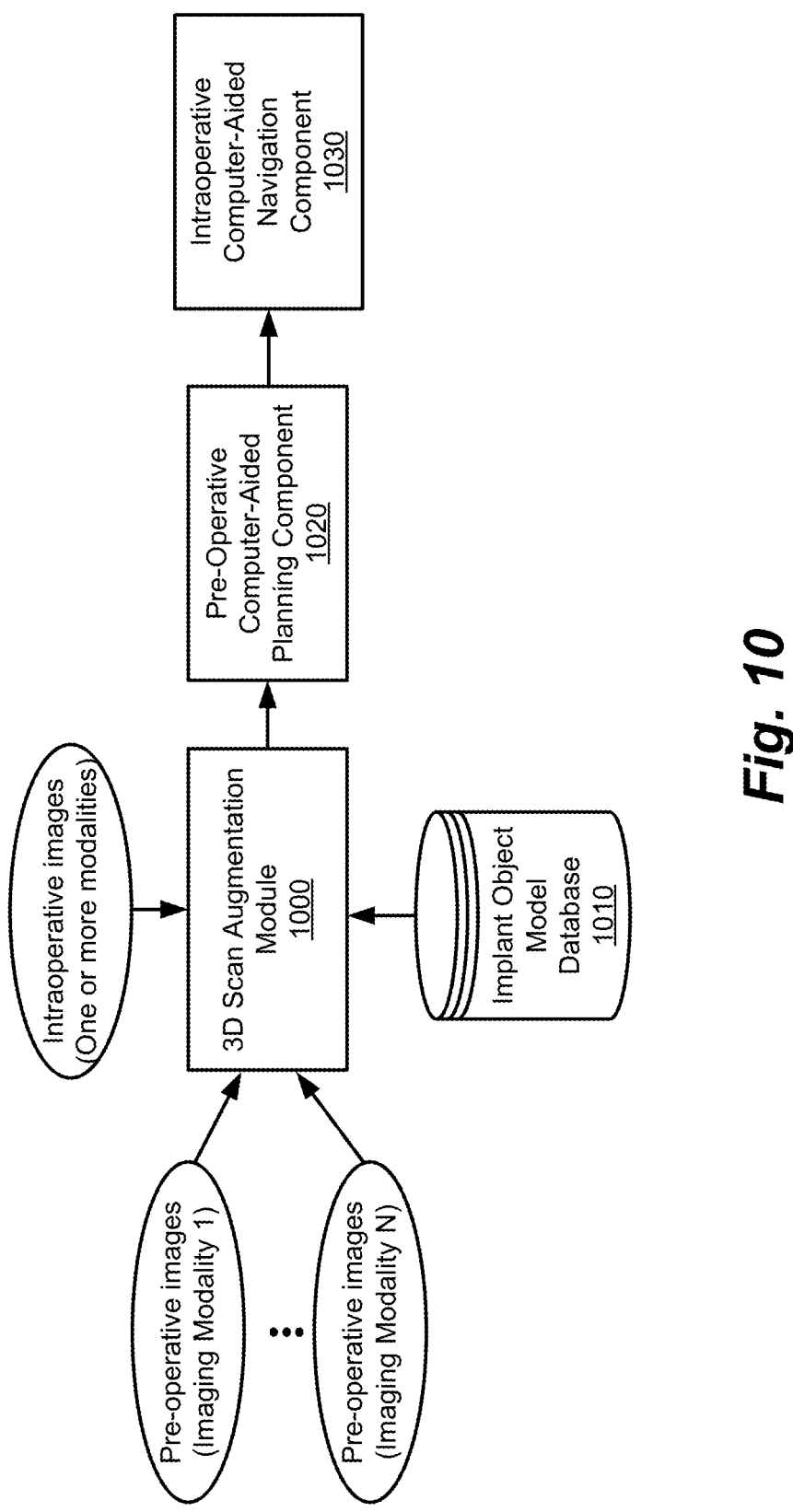
FIG. 10 illustrates another operational flowchart of an algorithm that augments a 3D scan of a patient to represent a CAD model corresponding to an object implanted in the patient, and which is used to perform pre-operative computer-aided planning and intraoperative computer-aided navigation in accordance with some embodiments.

FIG. 10 illustrates another operational flowchart of an algorithm that augments a 3D scan of a patient to represent a CAD model corresponding to an object implanted in the patient, and which is used to perform pre-operative computer-aided planning and intraoperative computer-aided navigation in accordance with some embodiments.

Referring to FIG. 10, a 3D scan augmentation module 1000 obtains pre-operative images which may include one or more 3D imaging modalities, and obtains 2D images of an object implanted in a patient. The 2D images of the implanted object may be obtained as intraoperative images using one or more 2D imaging modalities. The 3D scan augmentation module 1000 also obtains a CAD model corresponding to the object. The 3D scan augmentation module 1000 may have access to a database 1010 of implantable objects, which defines for each object a CAD model that defines shape and physical dimensions. The 3D scan augmentation module 1000 augments a 3D scan of a patient to represent the CAD model corresponding to the object implanted in the patient, in accordance with one or more of the embodiments disclosed herein. The augmented 3D scan may be provided to a preoperative computer-aided planning component 1020 that enables a user (e.g., surgeon) to plan a surgical procedure for the patient, and generate therefore a computer readable surgical plan. The computer readable surgical plan and/or the augmented 3D scan may be provided to an intraoperative computer-aided navigation component that provides navigation information to a user (e.g., surgeon) to enable computer-aided guidance during the surgical procedure on the patient.

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

What is claimed is:

1. A computer implemented method comprising:
   obtaining a plurality of 2D images of an object implanted in a patient;
   obtaining a computer-aided design (CAD) model corresponding to the object; and
   augmenting a 3D scan of the patient to provide a representation of the CAD model with a pose in a reference system of the 3D scan determined based on pose of the object in the 2D images;
   wherein, for each of the 2D images, the method comprises:
      determining poses of an emitter and a detector of an imaging device corresponding to when the 2D image was generated by the imaging device, and
      creating a back-propagation pyramid estimation of the object in a 3D voxel array based on the object oriented in the 2D image corresponding to the emitter posed at an apex and the detector posed at the base of the back-propagation pyramid, and where the number of voxels in the 3D voxel array is based on a number of pixels in the 2D image; and
      determining a 3D shape of the object in the 2D images based on superimposing the back-propagation pyramids.

2. The method of claim 1, wherein the augmenting of the 3D scan of the patient to provide the representation of the CAD model with the pose in the reference system of the 3D scan determined based on pose of the object in the 2D images, comprises:
   rendering a graphical representation of the object based on the CAD model; and
   overlaying the graphical representation of the object with the pose in the reference system of the 3D scan.

3. The method of claim 1, wherein the obtaining of the CAD model corresponding to the object, comprises:
   selecting the CAD model from a set of CAD models residing in a memory based on information identify the CAD model as corresponding to the object.

4. The method of claim 1, wherein:
   the CAD model defines shape and dimensions of the object; and
   the augmenting of the 3D scan of the patient provides the representation of the CAD model scaled based on the dimensions of the object defined by the CAD model and posed in the reference system of the 3D scan based on the pose of the object in the 2D images.

5. The method of claim 4, further comprising:
   projecting features of the shape defined by the CAD model into the 2D images; and
   determining the pose of the CAD model in the reference system of the 3D scan based on correlating features of the object in the 2D images to the projected features of the shape defined by the CAD model.

6. The method of claim 5, wherein the projecting of the features of the shape defined by the CAD model into the 2D images and the determining of the pose of the CAD model in the reference system of the 3D scan, comprise:
   estimating pose of the object in the 2D images;

computing expected object images based on the features having the shape defined by the CAD model projected into the 2D images using the estimated pose of the object in the 2D images;

comparing the expected object images to the 2D images of the object to compute a difference measure; and determining whether the difference measure satisfies a rule, and when the difference measure satisfies the rule determining a pose of the CAD model in a 3D space based on the estimating pose of the object in the 2D images, and determining the pose of the CAD model in the reference system of the 3D scan based on the pose of the CAD model in the 3D space.

7. The method of claim 6, further comprising:

when the difference measure does not satisfies the rule, adjusting the estimate of the pose of the object in the 2D images; and repeating the computing of new expected object images based on the features having the shape defined by the CAD model projected into the 2D images using the adjusted estimated pose of the object in the 2D images, the comparing of the new expected object images to the 2D images of the object to compute a new difference measure, and the determining whether the new difference measure satisfies the rule.

8. The method of claim 1, wherein the CAD model defines shape of the object, and further comprising:

correlating features of the shape of the object defined by the CAD model to corresponding features of the object in the 2D images;

estimating dimensions of the corresponding features of the object in the 2D images; and estimating dimensions of the shape of the object defined by the CAD model based on the estimated dimensions of the corresponding features of the object in the 2D images.

9. The method of claim 1, wherein the superimposing the back-propagation pyramids comprises:

performing a binary OR operation on values at corresponding locations in the 3D voxel array of the back-propagation pyramids.

10. The method of claim 1, further comprising:

determining a minimum number of 2D images to be used to create the back-propagation pyramids for determining the 3D shape of a defined cross-sectional feature of the object, based on a mathematical square of a minimum number of pixels in the 2D images to define an area enclosing the defined cross-sectional feature of the object.

11. The method of claim 1, further comprising:

registering a reference system of the 2D images to a reference system of the 3D scan; and determining pose of the object in the reference system of the 3D scan based on the pose of the object in the reference system of the 2D images and the registration of the reference system of the 2D images to the reference system of the 3D scan, wherein the augmenting of the 3D scan of the patient provides the representation of the CAD model with the determined pose of the object in the reference system of the 3D scan.

12. The method of claim 11, further comprising:

tracking poses of an imaging device relative to a dynamic reference base (DRB) attached to the patient at instances when the 2D images are captured by the imaging device, wherein the registering of the reference system of the 2D images to the reference system of the 3D scan is further based on the tracked poses of the imaging device relative to the DRB.

13. The method of claim 1, wherein:

the plurality of 2D images have a 2D imaging modality; and the 3D scan has a 3D imaging modality different from the 2D imaging modality.

14. The method of claim 13, wherein:

the 2D imaging modality is one of x-ray image, fluoroscopy image, and ultrasound image; and the 3D imaging modality is one of computerized tomography (CT), magnetic resonance imaging (MRI), Cone Beam Computerized Tomography (CBCT), Micro Computerized Tomography (MCT), and 3D ultrasound.

15. A computer processing platform comprising:

at least one network interface;

at least one processor connected to communicate through the at least one network interface; and at least memory storing instructions executable by the at least one processor to perform operations to:

obtain a plurality of 2D images of an object implanted in a patient;

obtain a computer-aided design (CAD) model corresponding to the object; and augment a 3D scan of the patient to provide a representation of the CAD model with a pose in a reference system of the 3D scan determined based on pose of the object in the 2D images, wherein, for each of the 2D images, the computer processing platform comprises instructions configured to perform operations to:

determine poses of an emitter and a detector of an imaging device corresponding to when the 2D image was generated by the imaging device;

create a back-propagation pyramid estimation of the object in a 3D voxel array based on the object oriented in the 2D image corresponding to the emitter posed at an apex and the detector posed at the base of the back-propagation pyramid, wherein the number of voxels in the 3D voxel array is based on a number of pixels in the 2D image; and determine a 3D shape of the object in the 2D images based on superimposing the back-propagation pyramids.

16. The computer processing platform of claim 15, wherein the operations to augment the 3D scan of the patient to provide the representation of the CAD model with the pose in the reference system of the 3D scan determined based on pose of the object in the 2D images, comprises to:

render a graphical representation of the object based on the CAD model; and overlay the graphical representation of the object with the pose in the reference system of the 3D scan.

17. The computer processing platform of claim 15, wherein the CAD model defines shape and dimensions of the object, and the operations further comprise to project features of the shape defined by the CAD model into the 2D images, and to determine the pose of the CAD model in the reference system of the 3D scan based on correlating features of the object in the 2D images to the projected features of the shape defined by the CAD model.

18. The computer processing platform of claim 15, wherein the CAD model defines shape of the object, and the operations further comprise to:

correlate features of the shape of the object defined by the CAD model to corresponding features of the object in the 2D images;

estimate dimensions of the corresponding features of the object in the 2D images; and estimate dimensions of the shape of the object defined by the CAD model based on the estimated dimensions of the corresponding features of the object in the 2D images.

* * * * *

16